United States Patent
Onishi

(10) Patent No.: US 11,901,744 B2
(45) Date of Patent: *Feb. 13, 2024

(54) CONTROL DEVICE, POWER RECEIVING DEVICE, ELECTRONIC APPARATUS, AND POWER TRANSMISSION SYSTEM

(71) Applicant: SEIKO EPSON CORPORATION, Tokyo (JP)

(72) Inventor: Kota Onishi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 113 days.

This patent is subject to a terminal disclaimer.

(21) Appl. No.: 17/026,485

(22) Filed: Sep. 21, 2020

(65) Prior Publication Data

US 2021/0013739 A1 Jan. 14, 2021

Related U.S. Application Data

(63) Continuation of application No. 15/433,578, filed on Feb. 15, 2017, now Pat. No. 10,804,725.

(30) Foreign Application Priority Data

Feb. 26, 2016 (JP) ................................ 2016-035449

(51) Int. Cl.
*H02J 50/80* (2016.01)
*H02J 7/00* (2006.01)
(Continued)

(52) U.S. Cl.
CPC .......... *H02J 50/80* (2016.02); *H02J 7/00034* (2020.01); *H02J 50/10* (2016.02); *H02J 50/12* (2016.02);
(Continued)

(58) Field of Classification Search
CPC .. H02J 7/025; H02J 50/10; H02J 50/12; H02J 50/80; H02J 50/90; H02J 7/00034;
(Continued)

(56) References Cited

U.S. PATENT DOCUMENTS 6,286,127 B1 9/2001 King et al.
6,385,437 B1 5/2002 Park et al.
(Continued)

FOREIGN PATENT DOCUMENTS

JP 2008-206325 A 9/2008
JP 2009-303294 A 12/2009
(Continued)

*Primary Examiner* — Edward Tso
*Assistant Examiner* — Aaron Piggush
(74) *Attorney, Agent, or Firm* — Oliff PLC

(57) ABSTRACT

A control device includes a control portion that controls a power supply portion that supplies power to a load based on received power received by a power receiving portion from a power transmitting device. In the case where the power receiving portion, after receiving a signal having a first frequency and a first duty from the power transmitting device, receives a signal having a second frequency that is different from the first frequency or a signal having a second duty that is different from the first duty, the control portion specifies an issued command based on a length of a reception period of the signal having the second frequency or the signal having the second duty.

11 Claims, 17 Drawing Sheets

(51) Int. Cl.
  *H02J 50/10* (2016.01)
  *H02J 50/90* (2016.01)
  *H02J 50/12* (2016.01)
  *B60L 53/12* (2019.01)
  *H04B 5/00* (2006.01)

(52) U.S. Cl.
  CPC ............... *H02J 50/90* (2016.02); *B60L 53/12* (2019.02); *H04B 5/0037* (2013.01); *H04B 5/0081* (2013.01)

(58) Field of Classification Search
  CPC ..... B60L 53/12; B60L 53/126; H04B 5/0037; H04B 5/0081
  USPC .......................................... 320/108, 145, 155
  See application file for complete search history.

(56) References Cited

U.S. PATENT DOCUMENTS

| | | | |
|---|---|---|---|
| 6,721,540 | B1 | 4/2004 | Hayakawa |
| 7,778,339 | B2 | 8/2010 | Murakami et al. |
| 8,179,089 | B2 | 5/2012 | Shiozaki et al. |
| 8,946,939 | B2 | 2/2015 | Drennen |
| 9,030,051 | B2 | 5/2015 | Muratov |
| 9,101,777 | B2 * | 8/2015 | John .................... H02J 7/025 |
| 9,306,401 | B2 * | 4/2016 | Lee ..................... H02J 7/00 |
| 10,804,725 | B2 * | 10/2020 | Onishi ................... H02J 50/80 |
| 2006/0071768 | A1 * | 4/2006 | Iwazumi ............. B60C 23/0442 340/447 |
| 2008/0197804 | A1 | 8/2008 | Onishi et al. |
| 2009/0067647 | A1 * | 3/2009 | Yoshizawa .......... G10L 21/0272 381/119 |
| 2009/0127936 | A1 * | 5/2009 | Kamijo .................. H02J 50/12 307/104 |
| 2010/0213895 | A1 | 8/2010 | Keating et al. |
| 2010/0331915 | A1 | 12/2010 | Hill et al. |
| 2011/0037321 | A1 | 2/2011 | Chatterjee et al. |
| 2011/0278949 | A1 * | 11/2011 | Tsai ...................... H04L 1/243 307/104 |
| 2012/0161543 | A1 | 6/2012 | Reuven et al. |
| 2014/0091626 | A1 * | 4/2014 | Walley ................... H02J 50/12 307/104 |
| 2014/0094116 | A1 | 4/2014 | Walley et al. |
| 2014/0203758 | A1 | 7/2014 | Moshfeghi |
| 2014/0223204 | A1 | 8/2014 | Haraguchi |
| 2014/0354066 | A1 | 12/2014 | Watanabe et al. |
| 2014/0357185 | A1 | 12/2014 | Li |
| 2015/0008756 | A1 * | 1/2015 | Lee ...................... H04B 5/0081 307/104 |
| 2015/0229152 | A1 | 8/2015 | Wen |
| 2016/0118810 | A1 * | 4/2016 | Park ..................... H02J 7/0013 307/104 |
| 2016/0210616 | A1 * | 7/2016 | Lee ...................... H04B 5/0037 |
| 2016/0323862 | A1 * | 11/2016 | Lee ...................... H04L 5/0053 |
| 2016/0377709 | A1 * | 12/2016 | Wang ..................... G01S 11/08 342/454 |
| 2017/0011527 | A1 * | 1/2017 | Matsunaga ........ G09B 19/0038 |

FOREIGN PATENT DOCUMENTS

| | | |
|---|---|---|
| JP | 2010-028934 A | 2/2010 |
| WO | 00/57531 A1 | 9/2000 |

* cited by examiner

| | |
|---|---|
| $cont_{1,32}$ | 2720 |
| $\Delta cont_{f2}$ | 20 |
| $\Delta t_{judge}$ | 13 |

FIG. 7

| NUMBER OF $cont_{2,32}$'s INCLUDED IN $T_{RS}$ | RECEPTION PERIOD $T_{MS}$ | ISSUED COMMAND |
|---|---|---|
| 0 | --- | --- |
| 1 | $f2 \times 64clk$ | NORMAL CHARGING COMMAND |
| 2 | | |
| 3 | | |
| 4 | $f2 \times 160clk$ | QUICK CHARGING COMMAND |
| 5 | | |
| 6 | | |
| 7 | $f2 \times 256clk$ | OFF-START COMMAND |
| 8 | | |

FIG. 8

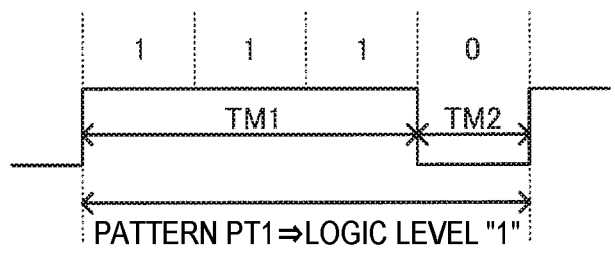
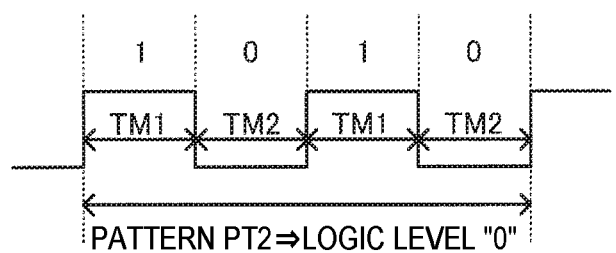
FIG. 15

| 16bit | 16bit | 16bit | 16bit |
|---|---|---|---|
| 0000h | (1) DATA CODE + RECTIFICATION VOLTAGE | (2)(3)(4)(5)(6)(7)(8) | (9)CRC |

FIG. 16A

| | bit15 ... bit0 | |
|---|---|---|
| (1) | DATA CODE | RECTIFICATION VOLTAGE |
| (2) | TEMPERATURE | |
| (3) | BATTERY VOLTAGE | |
| (4) | BATTERY CURRENT | |
| (5) | STATUS FLAG | |
| (6) | NUMBER OF CYCLES | |
| (7) | IC NUMBER, CHARGING EXECUTION, OFF START | |
| (8) | ID | |
| (9) | CRC | |

FIG. 16B

CONTROL DEVICE, POWER RECEIVING DEVICE, ELECTRONIC APPARATUS, AND POWER TRANSMISSION SYSTEM

CROSS REFERENCE

This application is a continuation of U.S. application Ser. No. 15/433,578, filed Feb. 15, 2017, the contents of which are incorporated herein by reference in their entirety.

BACKGROUND

1. Technical Field

The present invention relates to a control device, a power receiving device, an electronic apparatus, a power transmission system, and the like.

2. Related Art

In recent years, much attention has been paid to contactless power transmission (wireless power transfer) in which electromagnetic induction is used to make power transmission possible without a metal contact. Charging of electronic apparatuses such as a household appliance, a mobile terminal, and an electric car has been proposed as an application example of the contactless power transmission.

Also, when contactless power transmission is performed, data such as a control command (command) needs to be transmitted from a power transmitting device to a power receiving device, for example. Technologies disclosed in WO 2000/057531 and JP-A-2008-206325, for example, are known technologies for exchanging various types of data between the power transmitting device and the power receiving device when contactless power transmission is performed. For example, an invention in which the data to be transmitted is divided into a plurality of packets, and each packet is transmitted by being superimposed onto physical energy is disclosed in WO 2000/057531. Also, in JP-A-2008-206325, an invention is disclosed in which, when data is transmitted from the power transmitting device to the power receiving device, a bit "1" is transmitted by setting the frequency of a power transmission side clock to a first frequency, and a bit "0" is transmitted by setting the frequency of the power transmission side clock to a second frequency.

In a method of transmitting data from the power transmitting device to the power receiving device using packets or bits, as in inventions disclosed in WO 2000/057531 and JP-A-2008-206325 described above, for example, the power receiving device needs to analyze the received signal in order to specify the content of data that has been transmitted. Therefore, the scale of the circuit in the power receiving device increases, and the manufacturing cost of the power receiving device increases substantially.

SUMMARY

According to some aspects of the invention, a control device, a power receiving device, an electronic apparatus, a power transmission system and the like can be provided in which, in a contactless power transmission system, a power receiving device can accurately specify an issued command issued by a power transmitting device while suppressing an increase in the scale of the circuit of the power receiving device.

One aspect of the invention relates to a control device included in a power receiving device that contactlessly receives power from a power transmitting device. The control device includes a control portion that controls a power supply portion that supplies power to a load based on received power received by a power receiving portion in the power receiving device from the power transmitting device. In the case where the power receiving portion, after receiving a signal having a first power transmission frequency and a first duty from the power transmitting device, has received a signal having a second power transmission frequency that is different from the first power transmission frequency or a signal having a second duty that is different from the first duty from the power transmitting device, the control portion specifies an issued command issued by the power transmitting device based on a length of a reception period during which the power receiving portion has received the signal having the second power transmission frequency or the signal having the second duty.

In one aspect of the invention, an issued command issued by the power transmitting device is specified based on the length of a reception period during which a signal having a second power transmission frequency that is different from a first power transmission frequency or a signal having a second duty that is different from a first duty has been received after having received a signal having the first power transmission frequency and the first duty.

Accordingly, in the contactless power transmission system, the power receiving device can accurately specify an issued command issued by the power transmitting device while suppressing an increase in the scale of the circuit of the power receiving device.

Also, in one aspect of the invention, the control portion, in the case of having judged that the length of the reception period is a first length, may specify that the issued command is a first command, and in the case of having judged that the length of the reception period is a second length that is different from the first length may specify that the issued command is a second command that is different from the first command.

Accordingly, it becomes possible for the power receiving device to specify which type of issued command, among a plurality of types of issued command, the received issued command is, and the like.

Also, in one aspect of the invention, the first command may be a normal charging command, and the second command may be a quick charging command.

Accordingly, it becomes possible that the power receiving device, in the case of having received the normal charging command, performs normal charging, and in the case of having received the quick charging command, performs quick charging, and the like.

Also, in one aspect of the invention, the second power transmission frequency may be a frequency that is higher than the first power transmission frequency.

Accordingly, as a result of detecting the second power transmission frequency that is higher than the first power transmission frequency, a period during which power has been received with the second power transmission frequency that is different from the first power transmission frequency can be detected, and it becomes possible to detect the length of the reception period, and the like.

Also, in one aspect of the invention, the control portion may measure a power transmission frequency in a given period before the reception period as a reference power transmission frequency, and may measure the length of the reception period based on the reference power transmission frequency.

Accordingly, even in a case where at least one of a clock signal generated by an oscillator circuit in the power transmitting device or a clock signal generated by a oscillator circuit in the power receiving device is shifted, it becomes possible to accurately measure the length of the reception period of the signal having the second power transmission frequency, and the like.

Also, in one aspect of the invention, the control portion, upon judging that the length of the reception period is a given length, may specify that the issued command is an off-start command.

Accordingly, it becomes possible for the power transmitting device to stop a discharging operation by the power receiving device to a power supply target, and the like.

Also, in one aspect of the invention, the control portion, upon judging that the off-start command has been received, may turn off a power supply operation in which power is supplied to a power supply target based on discharge power discharged from a battery.

Accordingly, it becomes possible to securely and effectively turn off the power supply operation of the discharging portion compared with a case where the power supply operation of the discharging portion is turned off manually, and the like.

Also, in one aspect of the invention, the control device includes an oscillator circuit that generates an oscillation signal, and the control portion may measure the length of the reception period based on the oscillation signal generated by the oscillator circuit.

Accordingly, it becomes possible for the power receiving device to obtain the count value of cycles of an oscillation signal on the secondary side corresponding to a given number of clocks when power is transmitted with a given power transmission frequency.

Also, in one aspect of the invention, the control device includes a communication portion that transmits communication data to the power transmitting device by load modulation. The control portion, in the case where the power transmitting device has made a response at a given timing after the communication portion started the load modulation, may measure the length of the reception period.

Accordingly, it becomes possible for the power receiving device to judge whether or not the power transmitting device has made an appropriate response at a predetermined timing, and the like.

Also, in one aspect of the invention, the control device includes a communication portion that transmits communication data to the power transmitting device by load modulation. The control portion, in the case where the power transmitting device has made a response to ID authentication information transmitted by the load modulation, may specify the issued command based on the length of the reception period, and may cause the communication portion to transmit confirmation information indicating that the power receiving device has received the issued command, by the load modulation.

Accordingly, it becomes possible for the power receiving device to perform simplified authentication processing regarding the power transmitting device, and the like.

Another aspect of the invention relates to a control device included in a power transmitting device that contactlessly transmits power to a power receiving device. The control device includes a control portion that controls a power transmission portion in the power transmitting device that transmits power to the power receiving device. The control portion, after causing the power transmission portion to transmit a signal having a first power transmission frequency and a first duty to the power receiving device, in the case of issuing a first command to the power receiving device, causes the power transmission portion to transmit a signal having a second power transmission frequency that is different from the first power transmission frequency, or a signal having a second duty that is different from the first duty, during a period having a first length, and in the case of issuing a second command that is different from the first command to the power receiving device, causes the power transmission portion to transmit the signal having the second power transmission frequency or the signal having the second duty, during a period having a second length that is different from the first length.

Accordingly, in the case where a plurality of types of issued command are provided, for example, it becomes possible for the power transmitting device to notify the power receiving device of different types of issued command by adjusting the period during which the signal having the second power transmission frequency that is different from the first power transmission frequency or the signal having the second duty that is different from the first duty is transmitted.

Also, in another aspect of the invention, the control portion may change the power transmission frequency or the duty at a given timing after the power receiving device has started load modulation.

Accordingly, it becomes possible for the power receiving device to measure the reception period of the signal having the second power transmission frequency or the signal having the second duty at a predetermined timing.

Also, another aspect of the invention relates to a control device included in a power transmitting device that contactlessly transmits power to the power receiving device. The control device includes a control portion that controls a power transmission portion in the power transmitting device that transmits power to the power receiving device. The control portion, after causing the power transmission portion to be driven at a first frequency and a first duty, in a case of issuing a first command to the power receiving device, causes the power transmission portion to be driven at a second frequency that is different from the first frequency or at a second duty that is different from the first duty, during a period having a first length, and in a case of issuing a second command that is different from the first command to the power receiving device, causes the power transmission portion to be driven at the second frequency or at the second duty, during a period having a second length that is different from the first length.

Also, another aspect of the invention relates to a power receiving device including the control device.

Also, another aspect of the invention relates to an electronic apparatus including the control device.

Another aspect of the invention relates to a power transmission system including a power transmitting device and a power receiving device. The power transmitting device transmits a signal having a first power transmission frequency and a first duty to the power receiving device, and in the case where the power receiving device is notified of an issued command, transmits a signal having a second power transmission frequency that is different from the first power transmission frequency or a signal having a second duty that is different from the first duty during a period having a length corresponding to the issued command. The power receiving device, after receiving the signal having the first power transmission frequency and the first duty from the power transmitting device, receives the signal having the second power transmission frequency or the signal having the second duty from the power transmitting device, and specifies the issued command based on a length of a reception period of the signal having the second power transmission frequency or the signal having the second duty.

BRIEF DESCRIPTION OF THE DRAWINGS

The invention will be described with reference to the accompanying drawings, wherein like numbers reference like elements.

FIG. 7 is a diagram for describing stored data used for specifying a power transmission frequency.

FIG. 8 is a diagram for describing a correspondence table relating to reception periods and issued commands.

FIG. 15 is a diagram for describing a communication method of the present embodiment.

FIG. 16A is a diagram for describing a format of communication data.

FIG. 16B is another diagram for describing the format of communication data.

DESCRIPTION OF EXEMPLARY EMBODIMENTS

Hereinafter, the present embodiment will be described. Note that the present embodiment described below is not intended to unduly limit the content of the invention described in the scope of claims. Also, not all configurations described in the present embodiment are necessarily essential elements of the invention.

1. Contactless Power Transmission System

Figure 1A:
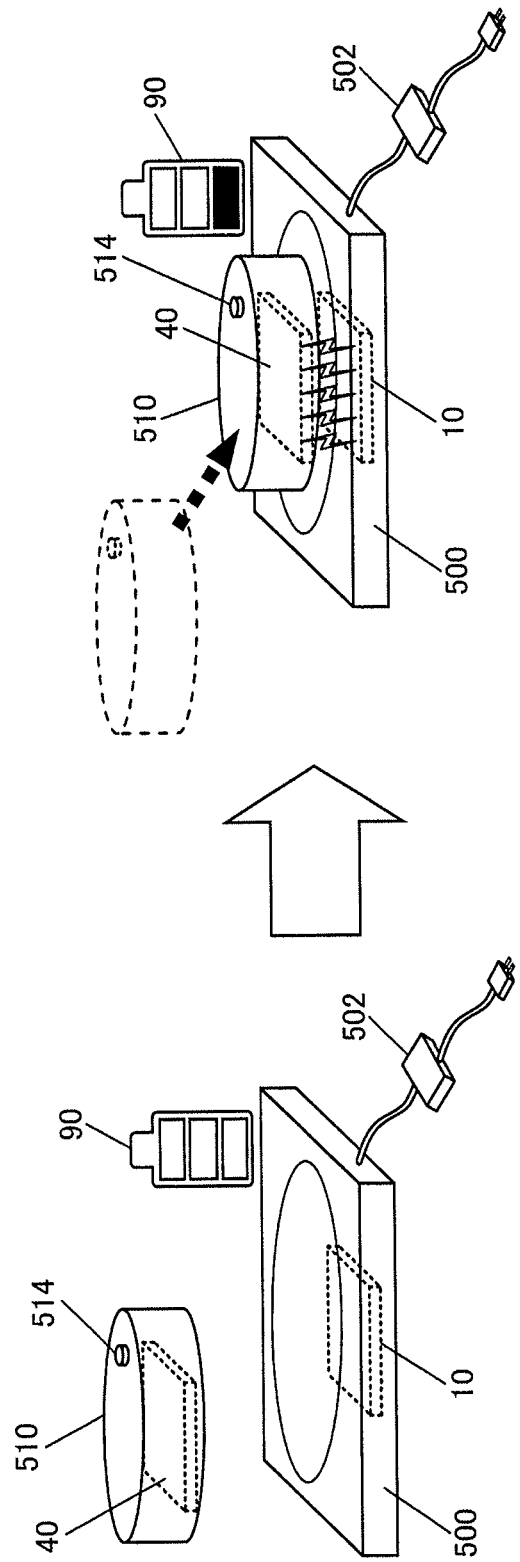
FIG. 1A is a diagram for describing a contactless power transmission system of the present embodiment.

An example of a contactless power transmission system of the present embodiment is shown in FIG. 1A. A charger 500 (one of electronic apparatuses) includes a power transmitting device 10. An electronic apparatus 510 includes a power receiving device 40. Also, the electronic apparatus 510 includes an operation switch portion 514 (an operation portion, in a broad sense) and a battery 90. Note that, although the battery 90 is schematically illustrated in FIG. 1A, the battery 90 is, in actuality, incorporated in the electronic apparatus 510. The contactless power transmission system of the present embodiment is constituted by the power transmitting device 10 and the power receiving device 40 in FIG. 1A.

Power is supplied to the charger 500 via a power supply adapter 502, and this power is transmitted by contactless power transmission from the power transmitting device 10 to the power receiving device 40. Accordingly, the battery 90 in the electronic apparatus 510 can be charged and allow a device in the electronic apparatus 510 to operate.

Note that a power supply of the charger 500 may be a power supply using a USB (USB cable). Also, various apparatuses can be envisioned as the electronic apparatus 510 to which the present embodiment is applied. For example, various electronic apparatuses can be envisioned such as a hearing aid, a watch, a biological information measuring device (wearable apparatus for measuring a pulse wave or the like), a mobile information terminal (such as a smartphone or a cellular phone), a cordless telephone, a shaver, an electric toothbrush, a wrist computer, a handy terminal, an onboard apparatus, a hybrid car, an electric car, an electric motorcycle, and an electric bicycle. For example, a control device (such as a power receiving device) of the present embodiment can be incorporated into various moving bodies such as a car, an airplane, a motorcycle, a bicycle, and a marine vessel. The moving bodies are apparatuses and devices that include drive mechanisms such as a motor and an engine, steering mechanisms such as a steering wheel and a rudder, and various electronic apparatuses (onboard apparatuses), and travel on the ground, through the air, and on the sea, for example.

Figure 1B:
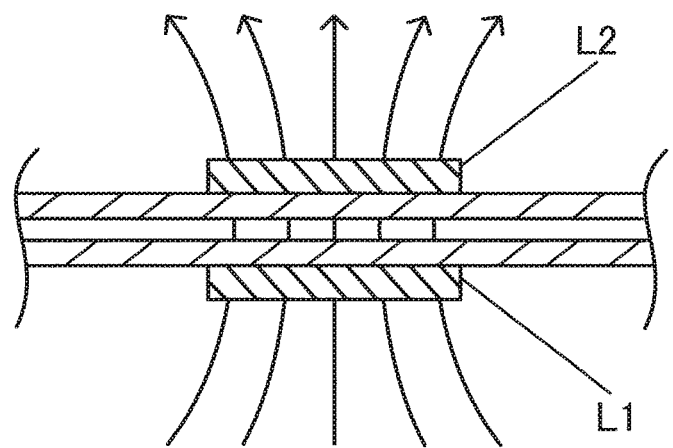
FIG. 1B is a diagram for describing a power transmission transformer configured by a primary coil and a secondary coil.

As schematically shown in FIG. 1B, power transmission from the power transmitting device 10 to the power receiving device 40 is realized as a result of forming a power transmission transformer by electromagnetically coupling a primary coil L1 (power transmitting coil) provided on a power transmitting side and a secondary coil L2 (power receiving coil) provided on a power receiving side, or the like. Accordingly, contactless power transmission is made possible. Note that various methods such as an electromagnetic induction method and a magnetic field resonance method can be adopted as the contactless power transmission method.

Figure 2:
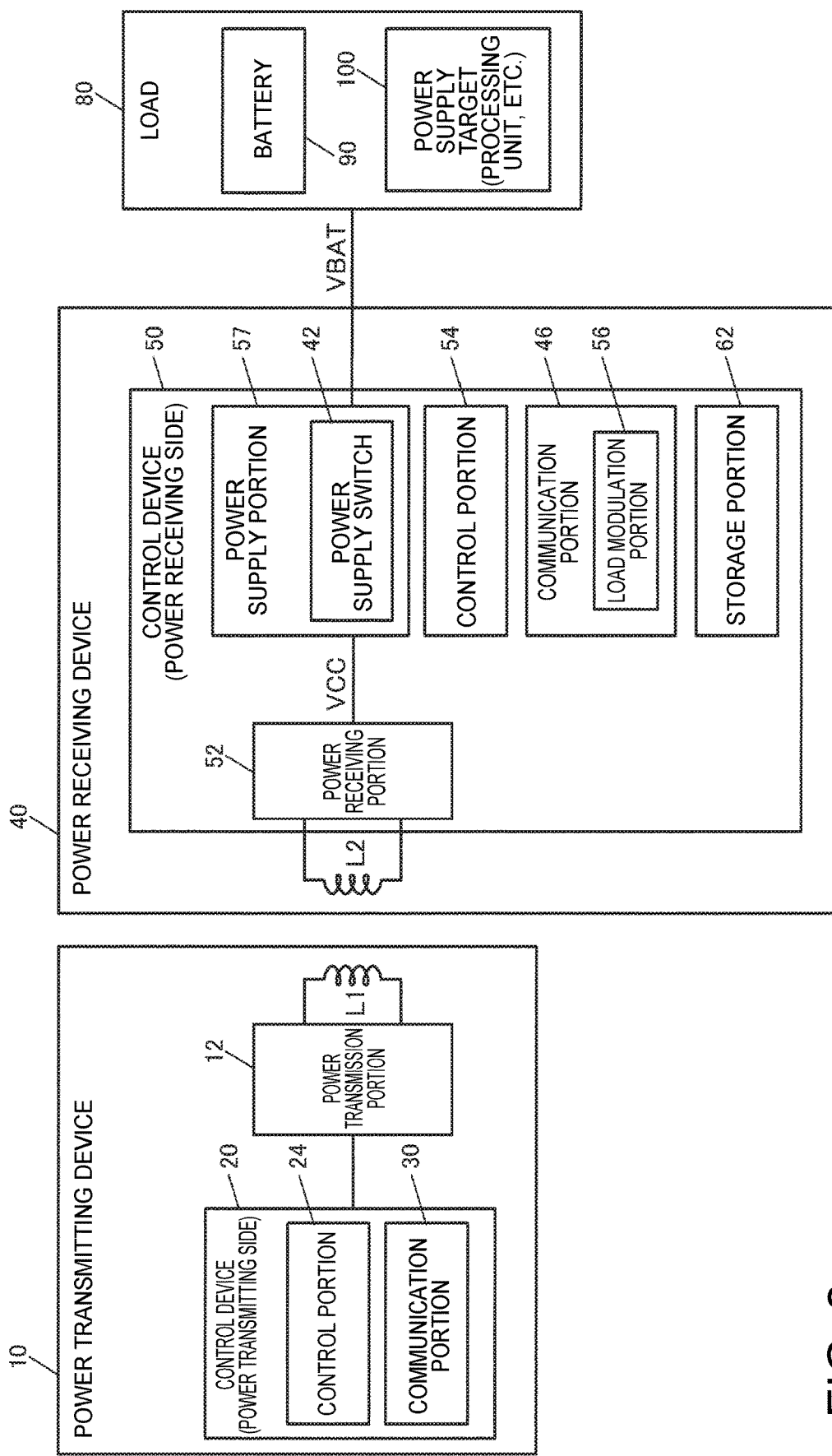
FIG. 2 is an exemplary configuration of a control device, a power transmitting device, and a power receiving device of the present embodiment.

2. Configurations of Power Transmitting Device, Power Receiving Device, and Control Device An exemplary configuration of control devices 20 and 50 of the present embodiment and the power transmitting device 10 and the power receiving device 40 that respectively includes the control devices 20 and 50 is shown in FIG. 2. Note that the configuration of these devices is not limited to the configuration in FIG. 2, and various modifications can be implemented such as omitting a portion of the constituent elements, adding another constituent element (a reporting portion, for example), or changing a connection relationship.

The electronic apparatus on the power transmitting side such as the charger 500 in FIG. 1A includes the power transmitting device 10. Also, the electronic apparatus 510 on the power receiving side includes the power receiving device 40 and a load 80. The load 80 can include the battery 90 and a power supply target 100. The power supply target 100 can be various devices such as a processing unit (such as DSP). According to the configuration in FIG. 2, a contactless power transmission (wireless power transfer) system is realized in which power is transmitted from the power transmitting device 10 to the power receiving device 40 by electromagnetically coupling the primary coil L1 and the secondary coil L2.

The power transmitting device 10 (power transmission module, primary module) includes a primary coil L1, a power transmission portion 12, a control device 20, and a communication portion 30, and contactlessly transmits power to the power receiving device 40. When power is to be transmitted, the power transmission portion 12 generates an AC voltage of a predetermined frequency and supplies the voltage to the primary coil L1. The power transmission portion 12 can include a power transmission driver that drives the primary coil L1, a power supply circuit (a power supply voltage control portion, for example) that supplies power to the power transmission driver, and at least one capacitor that constitutes a resonance circuit with the primary coil L1.

A power transmission transformer is formed when the primary coil L1 (transmission side coil) is electromagnetically coupled to the secondary coil L2 (receiving side coil). For example, when power transmission is needed, the electronic apparatus 510 is placed on the charger 500 so as to be in a state in which a magnetic flux of the primary coil L1 passes through the secondary coil L2, as shown in FIGS. 1A and 1B described above. On the other hand, when power transmission is not needed, the electronic apparatus 510 is physically separated from the charger 500 so as to be in a state in which the magnetic flux of the primary coil L1 does not pass through the secondary coil L2.

The control device 20 performs various types of control on the power transmitting side, and can be realized by an integrated circuit device (IC) or the like. The control device 20 includes a control portion 24 and the communication portion 30. Also, the control device 20 can include an unshown storage portion. Note that a modification in which the power transmission portion 12 is incorporated in the control device 20 or the like can be implemented.

The control portion 24 executes various types of control processing of the power transmitting side control device 20. For example, the control portion 24 controls the power transmission portion 12 in the power transmitting device 10 that transmits power to the power receiving device 40 and the communication portion 30. Specifically, the control portion 24 performs various types of sequence control and judgement processing necessary for power transmission, communication processing, and the like. The control portion 24 can be realized by a logic circuit such as a gate array that is generated by an automated place-and-route method, or various processors such as a microcomputer, for example.

The communication portion 30 performs communication processing for the communication of communication data with the power receiving device 40. For example, the communication portion 30 performs processing (communication processing) for detecting and receiving communication data from the power receiving device 40.

The power receiving device 40 (power reception module, secondary module) includes a secondary coil L2 and a control device 50, and contactlessly receives power from the power transmitting device 10. The control device 50 performs various types of control on the power receiving side, and can be realized by an integrated circuit device (IC) or the like. The control device 50 includes a power receiving portion 52, a control portion 54, a communication portion 46 (load modulation portion 56), and a power supply portion 57. Also, the control device 50 can include a storage portion 62. Note that a modification in which the power receiving portion 52 and the power supply portion 57 are provided external to the control device 50 or the like can be implemented.

The power receiving portion 52 receives power from the power transmitting device 10. Specifically, the power receiving portion 52 converts an AC voltage induced in the secondary coil L2 to a DC rectified voltage VCC, and outputs the rectified voltage VCC.

The power supply portion 57 supplies power to the load 80 based on received power that the power receiving portion 52 in the power receiving device 40 has received from the power transmitting device 10. For example, the power supply portion 57 charges the battery 90 by supplying power received by the power receiving portion 52. Alternatively, the power supply portion 57 supplies power from the battery 90 or power received by the power receiving portion 52 to the power supply target 100. The power supply portion 57 includes a power supply switch 42. The power supply switch 42 is a switch (switching element, switch circuit) for supplying power received by the power receiving portion 52 to the load 80. For example, the power supply switch 42 charges the battery 90, which is the load 80, by supplying power received by the power receiving portion 52 to the battery 90.

The control portion 54 performs various types of control processing of the control device 50 on the power receiving side. For example, the control portion 54 controls the communication portion 46 (load modulation portion 56) and the power supply portion 57. Also, the control portion 54 can control the power receiving portion 52 and the storage portion 62. The control portion 54 can be realized by a logic circuit such as a gate array that is generated by an automated place-and-route method, or various processors such as a microcomputer, for example.

The communication portion 46 performs communication in which communication data is transmitted to the power transmitting device 10. Alternatively, the communication portion 46 may perform communication in which communication data is received from the power transmitting device 10. For example, in the case where the communication portion 46 includes the load modulation portion 56, communication performed by the communication portion 46 can be realized by the load modulation portion 56 performing load modulation, for example. For example, the load modulation portion 56 includes a current source, and performs the load modulation using the current source. Note that the communication method used by the communication portion 46 is not limited to load modulation. For example, the communication portion 46 may perform communication using the primary coil L1 and the secondary coil L2 with a method other than load modulation. Alternatively, a coil that is different from the primary coil L1 and the secondary coil L2 is provided, and communication may be performed with a communication method, namely load modulation or the like, using this different coil. Alternatively, communication may be performed by proximity wireless communication using RF or the like.

The storage portion 62 stores various types of information. The storage portion 62 can be realized by a nonvolatile memory, for example, but is not limited thereto. For example, the storage portion 62 may be realized by a memory (ROM, for example) other than a nonvolatile memory. Alternatively, the storage portion 62 may be realized by a circuit using a fuse element, or the like.

The load 80 includes the battery 90 and the power supply target 100 of the battery 90. Note that a modification in which one of the battery 90 and the power supply target 100 is not provided can be implemented.

The battery 90 is, for example, a rechargeable secondary battery, and is a lithium battery (such as a lithium ion secondary battery or a lithium ion polymer secondary battery), a nickel battery (such as a nickel-hydrogen storage battery or a nickel-cadmium storage battery), or the like. The power supply target 100 is a device (integrated circuit device) such as a processing unit (DSP, microcomputer) that is provided in the electronic apparatus 510 (FIG. 1A) in which the power receiving device 40 is incorporated, and is a power supply target of the battery 90, for example. Note that the power received by the power receiving portion 52 may be directly supplied to the power supply target 100.

Figure 3:
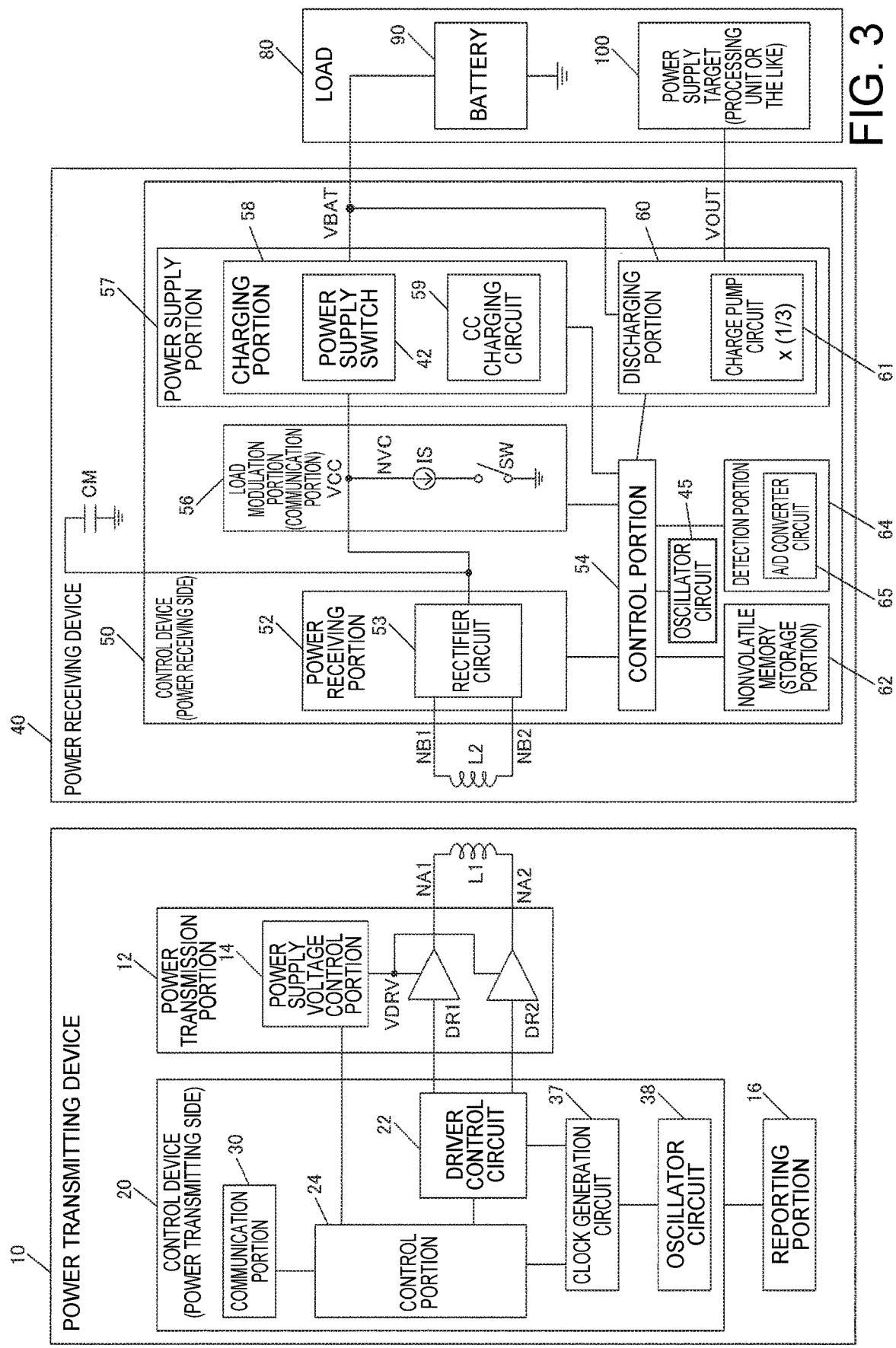
FIG. 3 is a detailed exemplary configuration of the control device, the power transmitting device, and the power receiving device of the present embodiment.

3. Detailed Exemplary Configuration of Power Transmitting Device, Power Receiving Device, and Control Device A detailed exemplary configuration of the control devices 20 and 50 of the present embodiment and the power transmitting device 10 and the power receiving device 40 including the same is shown in FIG. 3. Note that a detailed description of configurations of FIG. 3 that are similar to those of FIG. 2 will be omitted.

In FIG. 3, the power transmission portion 12 includes a first transmission driver DR1 that drives one end of the primary coil L1, a second transmission driver DR2 that drives the other end of the primary coil L1, and a power supply voltage control portion 14. Each of the transmission drivers DR1 and DR2 is realized by an inverter circuit (buffer circuit) or the like that is constituted by a power MOS transistor, for example. These transmission drivers DR1 and DR2 are controlled (driven) by a driver control circuit 22 in the control device 20. That is, the control portion 24 controls the power transmission portion 12 via the driver control circuit 22.

The power supply voltage control portion 14 controls a power supply voltage VDRV of the power transmission drivers DR1 and DR2. For example, a control portion 24 controls the power supply voltage control portion 14 based on communication data (transmitting power setting information) received from the power receiving side. Accordingly, the power supply voltage VDRV supplied to the power transmission drivers DR1 and DR2 is controlled, and variable control of the transmitting power is realized, for example. The power supply voltage control portion 14 can be realized by a DC/DC converter or the like. For example, the power supply voltage control portion 14 performs a step-up operation on the power supply voltage (5 V, for example) from the power supply, generates a power supply voltage VDRV (6 V to 15 V, for example) for the power transmission drivers, and supplies the power supply voltage VDRV to the power transmission drivers DR1 and DR2. Specifically, when increasing the transmitting power from the power transmitting device 10 to the power receiving device 40, the power supply voltage control portion 14 increases the power supply voltage VDRV that is supplied to the power transmission drivers DR1 and DR2, and when decreasing the transmitting power, the power supply voltage control portion 14 decreases the power supply voltage VDRV.

A reporting portion 16 (display portion) reports (displays) various states (being in power transmission, ID authentication or the like) of the contactless power transmission system using light, sound, an image or the like, and is realized by an LED, a buzzer, a display or the like, for example.

The power transmitting side control device 20 includes the driver control circuit 22, the control portion 24, the communication portion 30, a clock generation circuit 37, and an oscillator circuit 38. The driver control circuit 22 (pre-driver) controls the transmission drivers DR1 and DR2. For example, the driver control circuit 22 outputs a control signal (drive signal) to the gates of transistors that constitute the power transmission drivers DR1 and DR2, and causes the power transmission drivers DR1 and DR2 to drive the primary coil L1. The oscillator circuit 38 is constituted by a crystal-oscillator circuit or the like, and generates a clock signal for the primary side. The clock generation circuit 37 generates a drive clock signal that defines a power transmission frequency (drive frequency), or the like. Also, the driver control circuit 22 generates a control signal having a given frequency (power transmission frequency), based on the drive clock signal and the control signal from the control portion 24, and outputs the control signal to the power transmission drivers DR1 and DR2 in the power transmission portion 12 for control. Note that the present embodiment is not limited to the exemplary configuration shown in FIG. 3, and various modifications such as the power supply voltage control portion 14 being included in the control device 20 can be implemented.

The control device 50 on the power receiving side includes the power receiving portion 52, the control portion 54, a load modulation portion 56, the power supply portion 57, a nonvolatile memory 62, a detection portion 64, and an oscillator circuit 45.

The power receiving portion 52 includes a rectifier circuit 53 constituted by a plurality of transistors and diodes. The rectifier circuit 53 converts an AC induced voltage in the secondary coil L2 to a DC rectified voltage VCC, and outputs the rectified voltage VCC.

The load modulation portion 56 (communication portion, in a broad sense) performs load modulation. For example, the load modulation portion 56 includes a current source IS, and performs load modulation using the current source IS. Specifically, the load modulation portion 56 includes the current source IS (constant current source) and a switching element SW. The current source IS and the switching element SW are provided in series between a node NVC of the rectified voltage VCC and a GND (low potential side power supply voltage, in a broad sense) node, for example. The switching element SW is turned on and off based on a control signal from the control portion 54, for example, and a current (constant current) of the current source IS that flows from the node NVC to GND is caused to flow or be cut off, and thus the load modulation is realized.

Note that one end of a capacitor CM is connected to the node NVC, as shown in FIG. 3. The capacitor CM is provided as a component external to the control device 50, for example. Also, the switching element SW can be realized by a MOS transistor or the like. The switching element SW may be provided as a portion of the transistors that constitute a circuit of the current source IS. Also, the load modulation portion 56 is not limited to the configuration in FIG. 3, and various modifications such as using a resistor in place of the current source IS can be implemented.

The power supply portion 57 includes a charging portion 58 and a discharging portion 60. The charging portion 58 performs charging of the battery 90 (charging control) based on the power received by the power receiving portion 52.

For example, the charging portion 58 is supplied with a voltage that is based on the rectified voltage VCC (DC voltage, in a broad sense) from the power receiving portion 52, and charges the battery 90. The charging portion 58 can include a power supply switch 42 and a CC charging circuit 59. The CC charging circuit 59 is a circuit that performs CC (Constant-Current) charging of the battery 90.

The discharging portion 60 performs a discharging operation for discharging the battery 90. For example, the discharging portion 60 performs a power supply operation in which power is supplied to the power supply target 100 based on discharge power discharged from the battery 90. For example, the discharging portion 60 is supplied with a battery voltage VBAT from the battery 90, and supplies an output voltage VOUT to the power supply target 100. The discharging portion 60 can include a charge pump circuit 61. The charge pump circuit 61 steps down the battery voltage VBAT (to a third of the input voltage, for example), and supplies the stepped down voltage to the power supply target 100 as the output voltage VOUT (VBAT/3). The discharging portion 60 (charge pump circuit) operates with the battery voltage VBAT, for example, as the power supply voltage.

The nonvolatile memory 62 (storage portion, in a broad sense) is a nonvolatile memory device that stores various types of information. The nonvolatile memory 62 stores various types of information such as status information of the power receiving device 40, for example. An EEPROM or the like can be used as the nonvolatile memory 62. A MONOS (Metal-Oxide-Nitride-Oxide-Silicon) type memory can be used as the EEPROM, for example. A flash memory using a MONOS type memory can be used, for example. Alternatively, other types of memories such as a floating-gate type memory may be used as the EEPROM.

The detection portion 64 performs various detection operations. For example, the detection portion 64 performs various detection operations by monitoring the rectified voltage VCC, the battery voltage VBAT, and the like. Specifically, the detection portion 64 includes an A/D converter circuit 65, performs A/D conversion on voltages based on the rectified voltage VCC and the battery voltage VBAT, a temperature detection voltage from an unshown temperature detection portion, and the like by using the A/D converter circuit 65, and executes a detection operation using the obtained digital A/D converted values. Detection of over-discharge, over-voltage, over-current, and abnormal temperature (high temperature, low temperature) are envisioned as detection operations performed by the detection portion 64.

The oscillator circuit 45 is a CR oscillator circuit that is constituted by a capacitor and a resistor, or the like, generates a clock signal (oscillation signal) on the secondary side, and outputs the clock signal to the control portion 54. Note that the oscillator circuit 45 may be an oscillator circuit that causes an oscillator (such as a crystal oscillator provided external to the control device 50, for example) to oscillate.

In FIG. 3, the load modulation portion 56 starts load modulation when the output voltage VCC of the power receiving portion 52 becomes higher than the first voltage (VST) and landing is detected, and stops the load modulation when removal is detected. Specifically, the load modulation portion 56 starts the load modulation when landing of the electronic apparatus 510 is detected, as shown in FIG. 1A. The power transmitting device 10 (control portion 24) starts normal power transmission with the power transmission portion 12 on the condition that the power receiving device 40 (load modulation portion 56) has started the load modulation. Also, when removal of the electronic apparatus 510 is detected, the load modulation portion 56 stops the load modulation. The power transmitting device 10 (control portion 24) continues the normal power transmission by the power transmission portion 12 while the load modulation continues. That is, when the load modulation is no longer detected, the normal power transmission is caused to stop, and the power transmission portion 12 is caused to perform intermittent power transmission for landing detection, for example. In this case, the control portion 54 on the power receiving side can perform the landing detection and the removal detection based on the output voltage VCC of the power receiving portion 52.

Also, in FIG. 3, the communication portion 46 shown in FIG. 2 is realized by the load modulation portion 56 that transmits communication data by the load modulation. Specifically, the load modulation portion 56 performs load modulation such that the load modulation pattern constituted by a first load state and a second load state is a first pattern (first bit pattern) for a first logic level ("1", for example) of the communication data (bits of communication data) that is to be transmitted to the power transmitting device 10 (control device 20). On the other hand, the load modulation portion 56 performs load modulation such that the load modulation pattern is a second pattern (second bit pattern) that is different from the first pattern for a second logic level ("0", for example) of the communication data (bits of communication data) that is to be transmitted to the power transmitting device 10.

Meanwhile, the communication portion 30 on the power transmitting side determines that the communication data is communication data of the first logic level if the load modulation pattern is the first pattern. The communication portion 30 determines that the communication data is communication data of the second logic level if the load modulation pattern is the second pattern.

Here, the first pattern is a pattern in which the duration of a period in the first load state is longer than that in the second pattern, for example. For example, the communication portion 30 performs sampling of the load modulation pattern at given sampling intervals from a first sampling point set in a period in the first load state in the first pattern, and takes in communication data having the given number of bits (16 bits or 64 bits, for example).

With a method in which such a load modulation pattern is used, detection sensitivity with respect to the load change by the load modulation and noise immunity in detection can be improved. Accordingly, the first voltage, which is a communication start voltage (load modulation start voltage) can be set to a low voltage. As a result, it becomes possible to start communication upon detecting landing over a large distance range, and the power transmitting side is caused to perform control for charging the battery 90 (transmitting power control, for example).

Also, the control portion 54 (discharging system control portion) stops the discharging operation of the discharging portion 60 when landing is detected. That is, when landing of the electronic apparatus 510 is detected in FIG. 1A, the discharging operation (supply of VOUT) of the discharging portion 60 is stopped, and the power of the battery 90 is not discharged to the power supply target 100. Also, the control portion 54 causes the discharging portion 60 of the power supply portion 57 to perform the discharging operation in a removed period (a period in which the electronic apparatus 510 is removed). Due to this discharging operation, the power of the battery 90 is supplied to the power supply target 100 via the discharging portion 60.

4. Method of Present Embodiment

Next, processing in which an issued command issued by the power transmitting device is transmitted to the power receiving device, and the power receiving device specifies the transmitted issued command, in the present embodiment, will be described.

In the present embodiment, the power receiving portion 52, after receiving a signal having a first power transmission frequency f1 and a first duty from the power transmitting device 10, receives, from the power transmitting device 10, a signal having a second power transmission frequency f2 that is different from the first power transmission frequency f1 or a signal having a second duty that is different from the first duty. The control portion 54 specifies the issued command issued by the power transmitting device 10 based on the length of a reception period during which the power receiving portion 52 received the signal having the second power transmission frequency f2 or the signal having the second duty.

Here, the first power transmission frequency f1 is a power transmission frequency that is used when the power transmitting device 10 transmits power normally. Also, the first duty is a duty of the signal having the first power transmission frequency f1. To give a more specific description, the control portion 24 of the power transmitting device 10 outputs a control signal (such as a pulse signal) to the driver control circuit 22 in order to cause the power transmission portion 12 to transmit power at a given power transmission frequency. In order to realize the first power transmission frequency, for example, the control portion 24 outputs a first control signal to the driver control circuit 22. In this case, the first duty is a ratio of a period during which the first control signal is at a high level in one period of the first control signal relative to the one period. More specifically, in the case where the first control signal is a pulse signal, the first duty is a value resulting from dividing the pulse width of the pulse signal by the pulse period.

Also, the second power transmission frequency f2 is a power transmission frequency that is different from the first power transmission frequency f1, and is a power transmission frequency that is used when the power receiving device 40 is notified of an issued command issued by the power transmitting device 10. For example, the second power transmission frequency f2 is a frequency that is higher than the first power transmission frequency f1.

Similarly, the second duty is a duty that is different from the first duty, and is a duty that is used when an issued command issued by the power transmitting device 10 is notified to the power receiving device 40, for example. The second duty is a value that is smaller than the first duty, for example. Note that changing the duty from the first duty to the second duty is an example of a method of changing the power transmission frequency from the first power transmission frequency f1 to the second power transmission frequency f2. Note that the method of changing the power transmission frequency in the present embodiment is not limited to this.

Also, the reception period refers to a period during which the power receiving portion 52 receives the signal having the second power transmission frequency f2 or the signal having the second duty. In the later-described example in FIG. 4, the period $T_{MS}$ is the reception period.

Also, the issued command is a command that the power transmitting device 10 issues in order to notify the power receiving device 40 of a control instruction or the like.

The control portion 24 of the power transmitting device 10, after causing the power transmission portion 12 to transmit the signal having the first power transmission frequency f1 and the first duty to the power receiving device 40, in the case of issuing a first command to the power receiving device 40, causes the power transmission portion 12 to transmit the signal having the second power transmission frequency f2 or the signal having the second duty, during a period having a first length. On the other hand, the control portion 24, after causing the power transmission portion 12 to transmit the signal having the first power transmission frequency f1 and the first duty, in the case of issuing a second command that is different from the first command to the power receiving device 40, causes the power transmission portion 12 to transmit the signal having the second power transmission frequency f2 or the signal having the second duty during a period having a second length that is different from the first length. In other words, the control portion 24 of the power transmitting device 10, after driving the power transmission portion 12 at the first frequency and the first duty, in the case of issuing the first command to the power receiving device 40, drives the power transmission portion 12 at the second frequency that is different from the first frequency, or at the second duty that is different from the first duty, during a period having the first length. In the case of issuing the second command that is different from the first command to the power receiving device 40, the control portion 24 drives the power transmission portion 12 at the second frequency or at the second duty, during a period having the second length that is different from the first length.

Meanwhile, the control portion 54 of the power receiving device 40, in the case of determining that the length of a reception period of the signal having the second power transmission frequency f2 or the signal having the second duty is the first length, specifies that the issued command is the first command. On the other hand, the control portion 54, in the case of determining that the length of a reception period of the signal having the second power transmission frequency f2 or the signal having the second duty is the second length, specifies that the issued command is the second command.

In this way, in the present embodiment, when normal power transmission is performed, the power transmitting device 10 transmits a signal having the first duty at the first power transmission frequency f1. When an issued command is notified to the power receiving device 40, the power transmitting device 10 transmits the signal having the second power transmission frequency f2 or the signal having the second duty to the power receiving device 40. The power receiving device 40 specifies the issued command based on the length of the reception period of the signal having the second power transmission frequency f2 or the signal having the second duty.

In the present embodiment, a communication system in which data of the issued command is transmitted from the power transmitting device to the power receiving device using packets or bits, as in the inventions of aforementioned WO 2000/057531 and JP-A-2008-206325 is not used. Accordingly, in the present embodiment, it is not necessary that data such as a packet received by the power receiving device is analyzed in order to specify the content of the transmitted data, and the power receiving device can specify the issued command only by specifying the reception period. Therefore, the scale of the circuit in the power receiving device can be decreased, and an increase in the manufacturing cost of the power receiving device can be suppressed.

In the present embodiment, in this way, it becomes possible that, in the contactless power transmission system, the power receiving device 40 can accurately specify the issued command issued by the power transmitting device 10, while suppressing an increase in the scale of the circuit of the power receiving device 40.

Also, in the case where a plurality of types of issued command are provided, for example, it becomes possible that the power transmitting device 10 can notify the power receiving device 40 of different types of issued command by adjusting the period during which the signal having the second power transmission frequency f2 or the signal having the second duty is transmitted, and the like.

Also, it becomes possible for the power receiving device 40 to specify which type of issued command, among the plurality of types of issued command, the received issued command is, and the like.

For example, in the present embodiment, at least two issued commands, namely the first command and the second command, are provided as the plurality of types of issued command. The first command is a normal charging command, and the second command is a quick charging command, for example. The normal charging command is a command for instructing the power receiving device 40 to perform normal charging. Also, the quick charging command is a command for instructing the power receiving device 40 to perform quick charging whose speed of charging is faster than the normal charging. For example, the quick charging is a charging method in which the time it takes to fully charge the battery is shorter than the normal charging in the case of the same remaining battery amount. For example, in the case of CC charging, the normal charging command is a command for causing the battery to be charged with a first charging current, and the quick charging command is a command for causing the battery to be charged with a second charging current that is larger than the first charging current.

In this case, it becomes possible that the control portion 54 of the power receiving device 40 causes the charging portion 58 to perform normal charging when the reception period of the signal having the second power transmission frequency f2 or the signal having the second duty is the first length, and causes the charging portion 58 to perform quick charging when the reception period of the signal having the second power transmission frequency f2 or the signal having the second duty is the second length, and the like.

Figure 4:
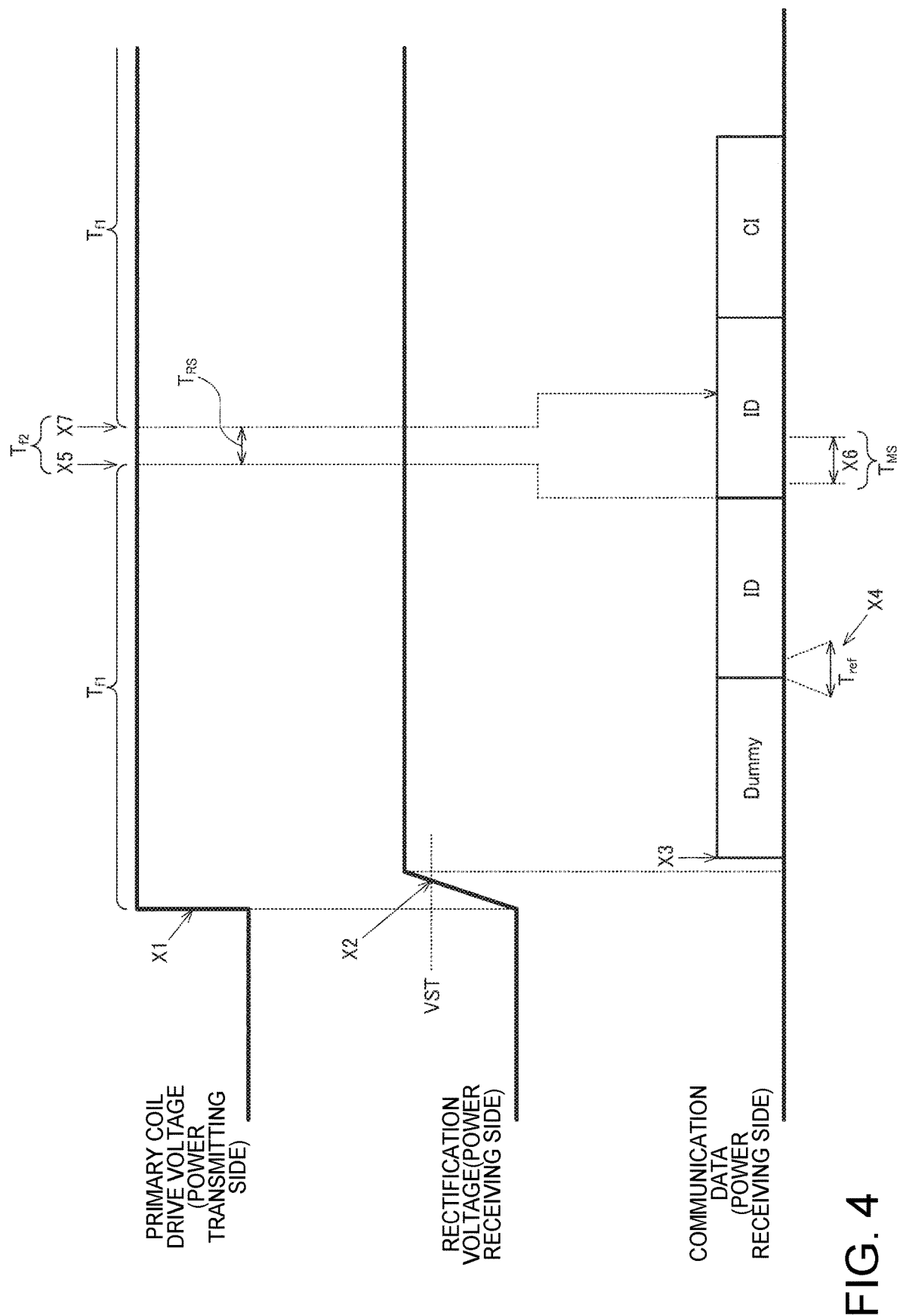
FIG. 4 is a diagram for describing processing for notifying of an issued command from the power transmitting device to the power receiving device.

Here, a specific example will be described using FIG. 4. FIG. 4 is a diagram for describing an example of a method in which the power receiving device 40 is notified of an issued command made from the power transmitting device 10 when the power receiving device 40 is landed. First, as shown in FIG. 3 described above, the control portion 24 of the power transmitting device 10 outputs a control signal to the driver control circuit 22. The driver control circuit 22 generates a control signal having the first power transmission frequency f1, and outputs the control signal to the power transmission drivers DR1 and DR2 of the power transmission portion 12. Accordingly, a drive voltage as shown in X1 in FIG. 4 is supplied to the primary coil L1 of the power transmission portion 12. Then, the power transmitting device 10 transmits power to the power receiving device 40 with the first power transmission frequency f1, and the rectification voltage that is output from the rectifier circuit 53 of the power receiving portion 52 increases. Note that, in FIG. 4, the period during which the power transmission frequency of the drive voltage that is supplied to the primary coil L1 is the first power transmission frequency is indicated by $T_{f1}$, and the period of second power transmission frequency is indicated by $T_{f2}$.

When the rectification voltage exceeds the first voltage (VST) as shown in X2 in FIG. 4, the load modulation portion 56 of the power receiving device 40 transmits communication data to the power transmitting device 10 by performing load modulation as shown in X3 in FIG. 4. At this time, the load modulation portion 56, after transmitting dummy data (Dummy in FIG. 4) for landing detection, transmits ID authentication information (ID information, ID code) for authenticating the power transmitting device 10 to the power transmitting side. In the example in FIG. 4, the power receiving device 40 transmits the ID authentication information twice.

Also, as shown in X4 in FIG. 4, the control portion 54 of the power receiving device 40 measures a reference power transmission frequency in a given period $T_{ref}$ in a first ID communication period. The reference power transmission frequency is a power transmission frequency that is used as the reference for measuring the second power transmission frequency f2. In the example in FIG. 4, for example, the reference power transmission frequency is the first power transmission frequency f1. Note that the specific measurement method of the reference power transmission frequency will be described later.

Meanwhile, the communication portion 30 of the power transmitting device 10 receives the first ID authentication information transmitted from the power receiving device 40. Next, the control portion 24 of the power transmitting device 10 changes the power transmission frequency or the duty at a given timing after the power receiving device 40 has started the load modulation (after the power transmitting device 10 has received the first ID authentication information). For example, in the example in FIG. 4, the control portion 24 of the power transmitting device 10 changes the power transmission frequency from the first power transmission frequency f1 to the second power transmission frequency f2 at a given timing X5 after the power receiving device 40 has started the load modulation. In the example in FIG. 4, the given timing X5 is a timing after the power transmitting device 10 has received the first ID authentication information. At this time, the control portion 24 causes the driver control circuit 22 to generate a second control signal having the second power transmission frequency f2 and transmit the second control signal to the power transmission drivers DR1 and DR2 of the power transmission portion 12. The control portion 24 notifies the power receiving device 40 of an arbitrary issued command by adjusting the length of the period during which the signal having the second power transmission frequency f2 is transmitted.

At this time, as shown in X5 in FIG. 4, the control portion 24 of the power transmitting device 10 makes a response to the authentication performed using the ID authentication information by changing the power transmission frequency from the first power transmission frequency f1 to the second power transmission frequency f2 in a response period $T_{RS}$ in a second ID communication period.

Accordingly, the power transmitting device 10 can make a response to the authentication performed using the ID authentication information, and the like, along with notifying of an issued command, for example.

Meanwhile, in the case where the power transmitting device 10 has made a response using the signal having the second power transmission frequency f2 or the signal having the second duty at a given timing (X5 in FIG. 4) after the load modulation portion 56 started load modulation, the control portion 54 of the power receiving device 40 measures the length of the reception period $T_{MS}$ as shown in X6 in FIG. 4, and specifies the issued command based on the measured length.

In other words, in the case where the power transmitting device 10 has made a response using the signal having the second power transmission frequency f2 or the signal having the second duty (X5 in FIG. 4) with respect to the ID authentication information transmitted by load modulation, the control portion 54 specifies the issued command based on the length of the reception period $T_{MS}$. For example, in the case where the power transmitting device 10 has made a response shown in X5 in FIG. 4, the control portion 54 of the power receiving device 40 determines that the power receiving device 40 has landed on a proper power transmitting device 10 (charger), and specifies the issued command. On the other hand, in the case where the power transmitting device 10 is only performing power transmission with the first power transmission frequency f1 during the response period $T_{RS}$ in FIG. 4 as well, the control portion 54 determines that a proper response has not been obtained, and does not specify the issued command. Note that the measurement method of the second power transmission frequency f2 and the specification method of the reception period $T_{MS}$ in the power receiving device 40 will be described in detail later.

Accordingly, the power receiving device 40 can judge whether or not the power transmitting device 10 has made an appropriate response at a predetermined timing, and thus can perform simplified authentication processing of the power transmitting device 10, and the like. Furthermore, in the case where the power transmitting device 10 has made a response normally, it becomes possible for the power receiving device 40 to specify the issued command that has been transmitted by the power transmitting device 10, and the like.

Thereafter, the control portion 54 causes the load modulation portion 56 to transmit confirmation information CI indicating that the power receiving device 40 has received the issued command, by load modulation.

Furthermore, the power transmitting device 10, after notifying of the issued command by changing the power transmission frequency to the second power transmission frequency f2 (X7 in FIG. 4), changes the power transmission frequency to the first power transmission frequency f1 again, and performs power transmission.

The control portion 54 of the power receiving device 40, upon judging that the specified issued command is the normal charging command, instructs the charging portion 58 to turn on the power supply switch 42 so as to perform normal charging of the battery 90. Similarly, the control portion 54 of the power receiving device 40, upon judging that the specified issued command is the quick charging command, instructs the charging portion 58 to turn on the power supply switch 42 so as to perform quick charging of the battery 90.

Also, in the case where the power transmitting device 10 has not made an appropriate response to the power receiving device 40 with the signal having the second power transmission frequency f2 at the timing X5 in FIG. 4, the control portion 54 of the power receiving device 40 judges that this power transmitting device 10 is an improper power transmitting device. Then, the control portion 54 instructs the charging portion 58 to turn off the power supply switch 42 so as to not perform charging of the battery 90.

4.1. Measurement Processing of Power Transmission Frequency and Specification Processing of Issued Command Next, a specific example of the measurement processing of the power transmission frequency and the specification processing of the issued command will be described.

Figure 5:
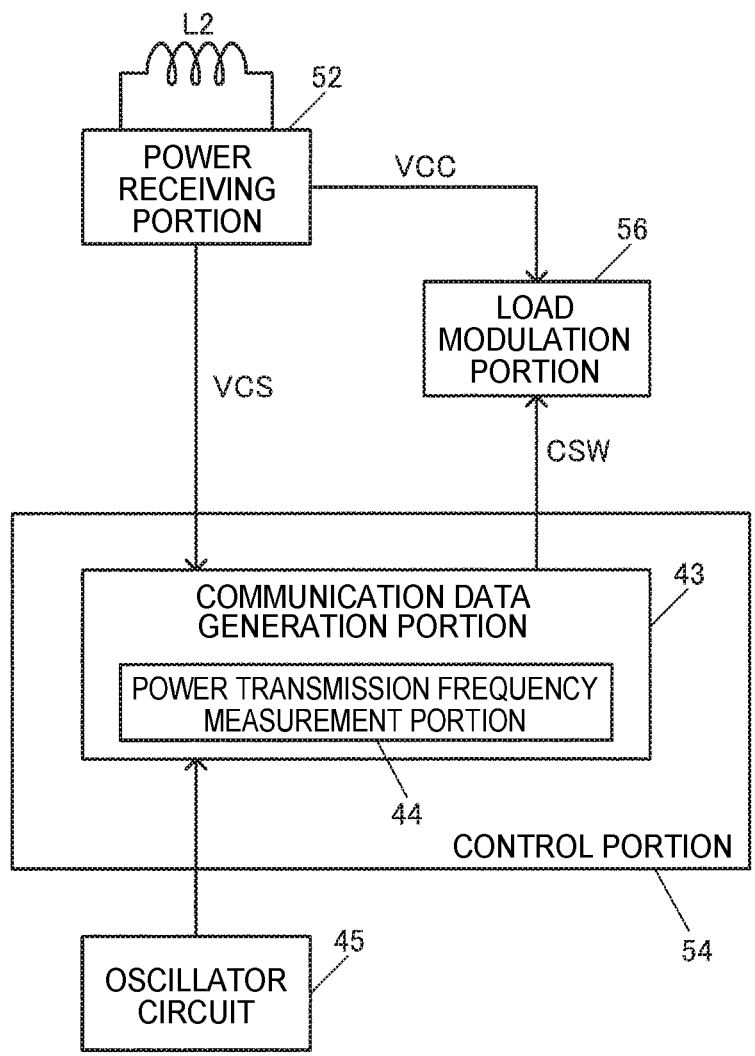
FIG. 5 is a diagram for describing a control portion of the power receiving device.

The control portion 54 includes a communication data generation portion 43, as shown in FIG. 5, and the communication data generation portion 43 includes a power transmission frequency measurement portion 44. The power transmission frequency measurement portion 44 measures the power transmission frequency in the given period $T_{ref}$ before the reception period $T_{MS}$ shown in FIG. 4 as the reference power transmission frequency, for example. As described above, in the example shown in FIG. 4, the first power transmission frequency f1 is used as the reference power transmission frequency. Note that the present embodiment is not limited thereto.

To give a more specific description, as shown in FIG. 5, the power receiving portion 52 extracts a rectangular wave signal VCS corresponding to the power transmission signal waveform by shaping the coil end signal of the secondary coil L2 using a hysteresis-type comparator, for example, and supplies the rectangular wave signal VCS to the communication data generation portion 43. Then, the power transmission frequency measurement portion 44 measures the reference power transmission frequency by measuring the period of the rectangular wave signal VCS corresponding to the power transmission signal waveform by counting a clock signal generated by the oscillator circuit 45.

Furthermore, the power transmission frequency measurement portion 44 measures the length of the reception period of the signal having the second power transmission frequency f2 or the signal having the second duty based on the measured reference power transmission frequency. In other words, the control portion 54 measures the length of the reception period of the signal having the second power transmission frequency f2 or the signal having the second duty based on the oscillation signal (clock signal on the secondary side) generated by the oscillator circuit 45.

Here, a specific example will be described using FIG. 6. The aforementioned rectangular wave signal VCS (FIG. 5) corresponding to the power transmission signal waveform and the clock signal on the secondary side generated by the oscillator circuit 45 of the power receiving device 40 are input to the power transmission frequency measurement portion 44. The power transmission frequency measurement portion 44 measures the length of a given number of clocks of the rectangular wave signal VCS using the clock signal on the secondary side generated by the oscillator circuit 45. For example, in the example in FIG. 6, the length of 32 clocks of the rectangular wave signal VCS obtained by receiving the signal having the first power transmission frequency f1 is obtained as equivalent to 2720 clocks of the clock signal on the secondary side, the result being obtained by counting the clock signal on the secondary side.

Figure 6:
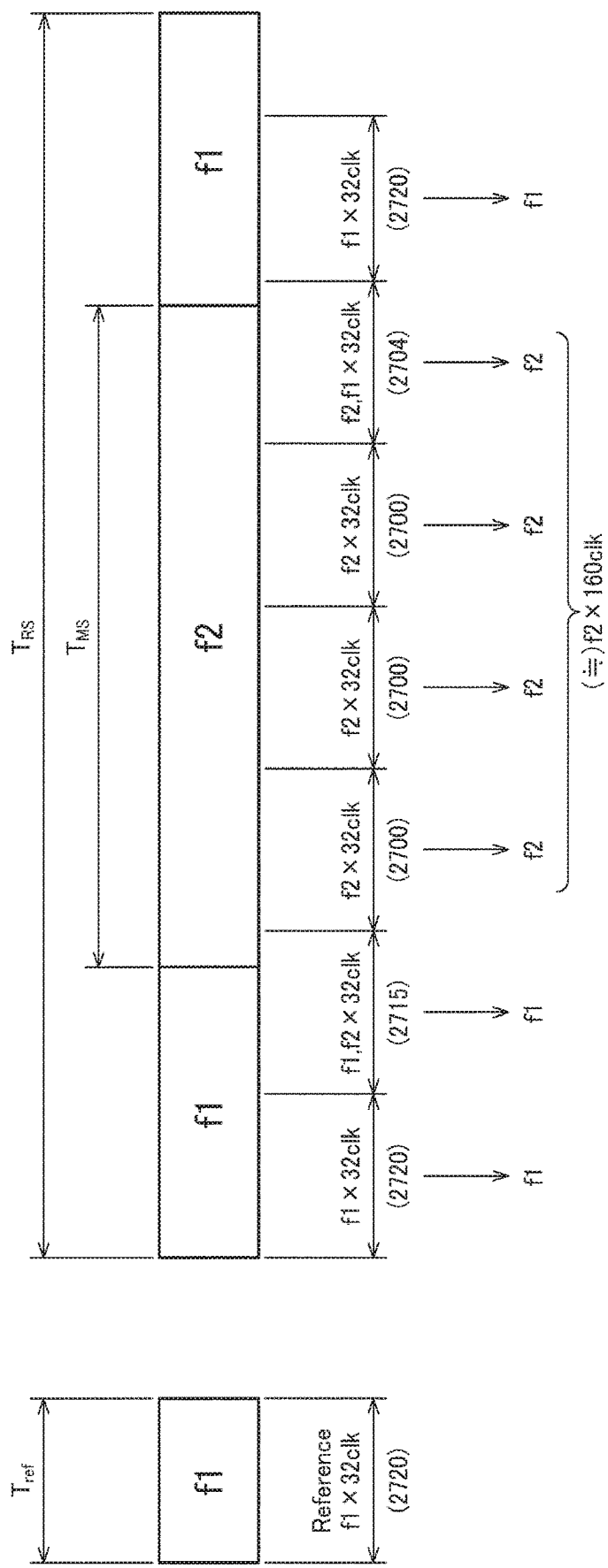
FIG. 6 is a diagram for describing specification processing in which a reception period of a signal having a second power transmission frequency is specified.

In other words, the power transmission frequency measurement portion 44 obtains the count value of the clock signal on the secondary side corresponding to the length of the given number of clocks of the rectangular wave signal VCS in the given period $T_{ref}$ shown in FIGS. 4 and 6. Here, the count value of the clock signal on the secondary side corresponding to the length of m clocks (m is a positive integer) of the rectangular wave signal VCS obtained by receiving a signal having an arbitrary power transmission frequency fj refers to a unit time secondary side clock conversion value $cont_{j,\,m}$ of the power transmission frequency fj. For example, in the example in FIG. 6, the arbitrary power transmission frequency fj is the first power transmission frequency (reference power transmission frequency), and m=32. A unit time secondary side clock conversion value $cont_{1,\,32}$ of the first power transmission frequency f1 is obtained as 2720.

Also, as shown in a table in FIG. 7, the unit time secondary side clock conversion value $cont_{1, 32}$ of the first power transmission frequency f1 (reference power transmission frequency) and the difference value $\Delta cont_{f2}$ from a unit time secondary side clock conversion value $cont_{2, 32}$ of the second power transmission frequency f2 are pre-stored in the nonvolatile memory 62 shown in FIG. 3. Therefore, when the $cont_{1, 32}$ is known, the $cont_{2, 32}$ can be calculated using the difference value $\Delta cont_f$. For example, in the example in FIG. 7, because the difference value $\Delta cont_f$ is 20, the $cont_{2, 32}$ can be calculated as 2700.

Next, as shown in FIG. 6, the length of the reception period $T_{MS}$ of the signal having the second power transmission frequency f2 in the response period $T_{RS}$ is specified using the $cont_{1, 32}$ and the $cont_{2, 32}$. The power transmission frequency measurement portion 44 similarly obtains the unit time secondary side clock conversion values successively in the response period $T_{RS}$ as well. As a result, in the example in FIG. 6 the unit time secondary side clock conversion values are obtained as 2720, 2715, 2700, 2700, 2700, 2704, and 2720 in chronological order. In this case, in the period whose unit time secondary side clock conversion value is 2720, which is the same as the $cont_{1, 32}$, it can be immediately judged that power transmission is performed with the first power transmission frequency f1, and in the period whose value is 2700, which is the same as the $cont_{2, 32}$, it can be immediately judged that power transmission is performed with the second power transmission frequency f2.

However, in the period whose unit time secondary side clock conversion value is 2715 and the period whose value is 2704, because the values match neither of the $cont_{1, 32}$ nor the $cont_{2, 32}$, the power transmission frequency is considered to have changed in the middle of each period. In this case, it is thought that the reception period $T_{MS}$ of the signal having the second power transmission frequency f2 cannot be specified.

Therefore, in the present embodiment, an allowable error range $\Delta t_{judge}$ with respect to the second power transmission frequency f2 is stored in the nonvolatile memory 62, as shown in the table of FIG. 7. The power transmission frequency measurement portion 44 judges that, in the case where the obtained unit time secondary side clock conversion value in a period is ($cont_{2, 32} - \Delta t_{judge}$) or more and ($cont_{2, 32} + \Delta t_{judge}$) or less, the period is a period in which power has been transmitted with the second power transmission frequency f2. Also, the power transmission frequency measurement portion 44 judges that, in the case where the obtained unit time secondary side clock conversion value in a period is less than ($cont_{2, 32} - \Delta t_{judge}$) or greater than or equal to ($cont_{2, 32} + \Delta t_{judge}$), the period is not a period in which power has been transmitted with the second power transmission frequency f2. Specifically, in the example in FIG. 7, since the $\Delta t_{judge}=13$ is set, the period whose unit time secondary side clock conversion value is included in a range from 2687 to 2712 is judged as a period in which power is transmitted with the second power transmission frequency f2. Therefore, in the example in FIG. 6, the period whose unit time secondary side clock conversion value is 2704 is judged as a period in which power has been transmitted with the second power transmission frequency f2, and the period whose unit time secondary side clock conversion value is 2715 is not judged as a period in which power has been transmitted with the second power transmission frequency f2. Accordingly, in the example in FIG. 6, the number of $cont_{2, 32}$s included in the response period $T_{RS}$ can be judged as four. Note that the number of $cont_{2, 32}$s included in the response period $T_{RS}$ refers to the number of unit periods, the length of the unit period being equivalent to 32 clocks on the primary side, in which power transmission can be judged as being performed with the second power transmission frequency f2 in the response period $T_{RS}$.

Next, the length of the reception period $T_{MS}$ of the signal having the second power transmission frequency f2 is specified, and the issued command is specified based on the reception period $T_{MS}$. In the present example, a correspondence table as shown in FIG. 8, for example, is stored in the nonvolatile memory 62. In the correspondence table in FIG. 8, the correspondence relationship between the number of $cont_{2, 32}$s included in the response period $T_{RS}$, the reception period $T_{MS}$, and the issued command is set.

Specifically, in the example in FIG. 8, the control portion 54, upon judging that the number of $cont_{2, 32}$s included in the response period $T_{RS}$ is 0, judges that the signal having the second power transmission frequency f2 has not been transmitted in the response period $T_{RS}$, and judges that no notification of the issued command was made. Also, the control portion 54, upon judging that the number of $cont_{2, 32}$s included in the response period $T_{RS}$ is in a range from one to three, judges that the reception period $T_{MS}$ of the signal having the second power transmission frequency f2 is a period whose length is equal to 64 clks of the clock of the second power transmission frequency f2, and judges that the normal charging command has been notified. Also, the control portion 54, upon judging that the number of $cont_{2, 32}$s included in the response period $T_{RS}$ is in a range from four to six, judges that the reception period $T_{MS}$ of the signal having the second power transmission frequency f2 is a period whose length is equal to 160 clks of the clock of the second power transmission frequency f2, and judges that a notification of the quick charging command was made. Furthermore, the control portion 54, upon judging that the number of $cont_{2, 32}$s included in the response period $T_{RS}$ is seven or eight, judges that the reception period $T_{MS}$ of the signal having the second power transmission frequency f2 is a period whose length is equal to 256 clks of the clock of the second power transmission frequency f2, and judges that a notification of the later-described off-start command was made. Therefore, in the example in FIG. 6, it can be judged that a notification of the quick charging command was made.

In summary, the power transmission frequency measurement portion 44 measures the power transmission frequency in the given period $T_{ref}$ before the reception period $T_{MS}$ as the reference power transmission frequency based on the clock signal on the secondary side (oscillation signal) generated by the oscillator circuit 45. Then, the control portion 54 measures the length of the reception period $T_{MS}$ of the signal having the second power transmission frequency f2 or the signal having the second duty based on the generated clock signal on the secondary side and the measured reference power transmission frequency.

In this way, as a result of using the oscillator circuit 45, the count conversion value ($cont_{1, 32}$, for example) of the oscillation signal on the secondary side corresponding to the given number of clocks (32 clks, for example) when power is transmitted with the reference power transmission frequency can be obtained. Furthermore, the count conversion value ($cont_{2, 32}$, for example) of the oscillation signal on the secondary side corresponding to the given number of clocks (32 clks, for example) when power is transmitted with the second power transmission frequency f2 can be obtained.

Also, as a result of measuring the reference power transmission frequency, even in a case where at least one of the clock signal generated by the oscillator circuit 38 on the primary side and the clock signal generated by the oscillator circuit 45 on the secondary side is shifted, it becomes possible to accurately measure the reception period of the signal having the second power transmission frequency f2, and the like. Note that the above description can also be applied to the signal having the second duty. Also, the various parameters (such as $\Delta cont_{f2}$, $\Delta t_{judge}$) shown in FIG. 7 described above are not limited to the aforementioned values. Furthermore, the nonvolatile memory 62 stores a plurality of $\Delta cont_{f2}$'s and a plurality of $\Delta t_{judge}$s, and the control portion 54 may select values to be used from the plurality of $\Delta cont_{f2}$s and the plurality of $\Delta t_{judge}$s.

4.2. Operation when Off-Start Command is Received

Also, the control portion 54, in the case of judging that the reception period $T_{MS}$ is the given length (third length), specifies that the issued command is the off-start command. For example, in the example in FIG. 8 described above, the control portion 54, upon judging that the number of $cont_{2, 32}$ is included in the response period $T_{RS}$ is seven or eight, judges that the reception period $T_{MS}$ of the signal having the second power transmission frequency f2 is a period whose length is equal to 256 clks of the clock of the second power transmission frequency f2, and judges that a notification of the off-start command was made.

Here, the off-start command is a command for forcibly turning off the power supply operation from the discharging portion 60 to the power supply target 100. In a general use scene, when the power receiving device 40 is removed from the power transmitting device 10, the charging portion 58 stops the charging operation by turning off the power supply switch 42, and the discharging portion 60 starts the power supply operation to the power supply target 100. However, when a product is shipped or the like, the power supply operation in the power receiving device 40 needs to be turned off after charging before shipment.

Therefore, the control portion 54, upon judging that the off-start command has been received, turns off the power supply operation of the discharging portion 60.

Accordingly, it becomes possible to securely and effectively turn off the power supply operation of the discharging portion 60, and the like, compared with a case where the power supply operation of the discharging portion 60 is turned off manually.

Also, it becomes possible for the power transmitting device 10 to stop the discharging operation of the power receiving device 40, and the like.

Figure 9:
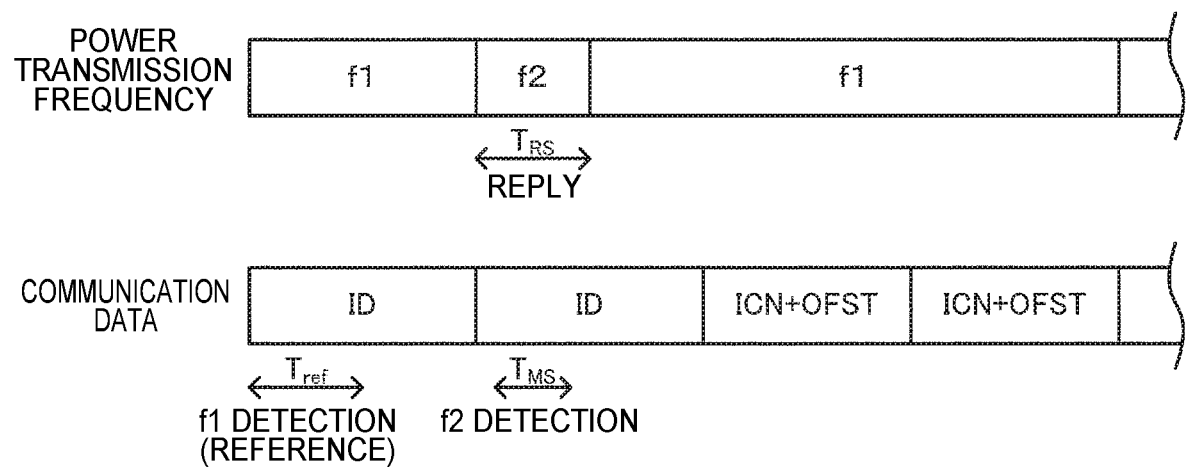
FIG. 9 is a diagram for describing processing when an off-start command is received.

A specific example will be described using FIG. 9. In the case of receiving the off-start command as the issued command, the power receiving device 40 transmits an IC number (ICN) and an off-start flag (OFST) to the power transmitting side as shown in FIG. 9. The flag OFST is notification information for notifying that the off-start mode is set. For example, in the case where the off-start mode is not set, the flag OFST=0 is transmitted, and in the case where the off-start mode is set, the flag OFST=1 is transmitted. Accordingly, the power transmitting side can recognize whether the off-start mode is set.

For example, when the product is manufactured and shipped, the operation mode is automatically set to the off-start mode by charging the power receiving device by a dedicated charger. An LED or the like serving as the reporting portion 16 is lit when the flag OFST=1 has been received from the power receiving side. In this way, a worker at the manufacturing site can confirm that the off-start mode is set.

5. Operation Sequence of Contactless Power Transmission System

Figure 10:
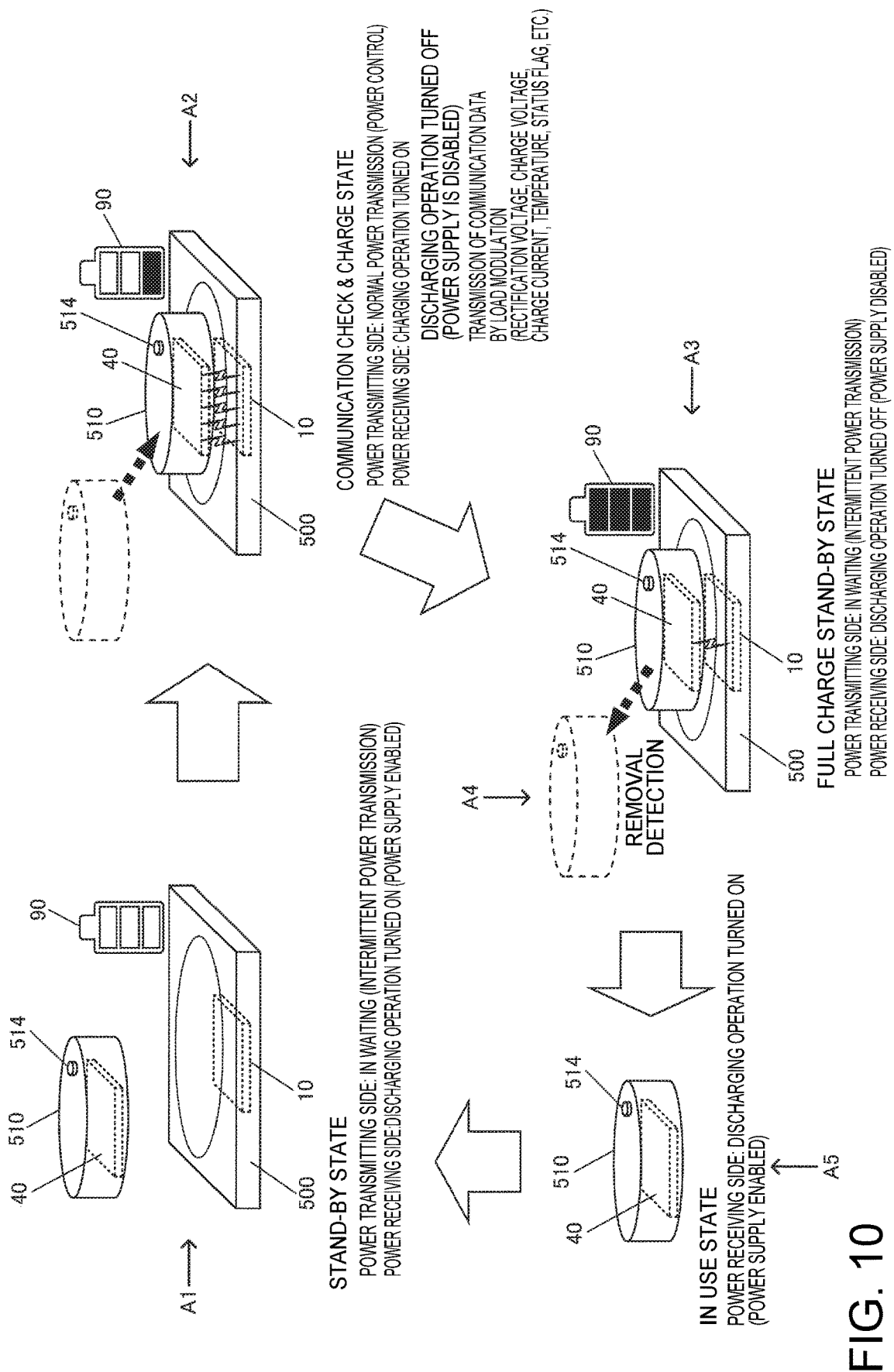
FIG. 10 is a diagram for describing an example of an operation sequence of the contactless power transmission system.

Next, an example of the whole operation sequence of the contactless power transmission system of the present embodiment will be described. FIG. 10 is a diagram for describing an outline of an operation sequence.

In A1 in FIG. 10, the electronic apparatus 510 including the power receiving device 40 is not placed on the charger 500 including the power transmitting device 10, and is in a removed state. In this case, a stand-by state is realized. In the stand-by state, the power transmission portion 12 in the power transmitting device 10 is in a state in which landing of the electronic apparatus 510 is detected by performing intermittent power transmission for landing detection. Also, in the stand-by state, the discharging operation to the power supply target 100 is turned on in the power receiving device 40, and the power supply to the power supply target 100 is enabled. Accordingly, the power supply target 100 such as a processing unit is supplied with the power from the battery 90, and can operate.

As shown in A2 in FIG. 10, when the electronic apparatus 510 is placed on the charger 500, and landing is detected, a communication check & charge state is realized. In the communication check & charge state, the power transmission portion 12 in the power transmitting device 10 performs normal power transmission which is continuous power transmission. Here, the power transmission portion 12 performs normal power transmission while performing power control in which the power is variably changed depending on the state of power transmission or the like. Also, control based on the charge state of the battery 90 is performed. The power transmission state is a state determined by a positional relationship (distance between coils or the like) between the primary coil L1 and the secondary coil L2 or the like, and can be determined based on information such as the rectified voltage VCC, which is the output voltage from the power receiving portion 52. The charge state of the battery 90 can be determined based on the information such as the battery voltage VBAT.

Also, in the communication check & charge state, the charging operation of the charging portion 58 in the power receiving device 40 is turned on, and charging of the battery 90 is performed based on the power received by the power receiving portion 52. Also, the discharging operation of the discharging portion 60 is turned off, and power from the battery 90 is not supplied to the power supply target 100. Also, in the communication check & charge state, communication data is transmitted to the power transmitting side by load modulation performed by the load modulation portion 56. For example, communication data including transmitting power setting information (such as VCC), charge status information (such as VBAT and various status flags), and information such as a temperature is transmitted from the power receiving side to the power transmitting side by regular load modulation in a normal power transmission period.

As shown in A3 in FIG. 10, when full charge of the battery 90 is detected, a full charge stand-by state is realized. In the full charge stand-by state, the power transmission portion 12 is in a state in which intermittent power transmission for removal detection is performed so as to detect removal of the electronic apparatus 510. Also, the discharging operation of the discharging portion 60 remains off, and the power supply to the power supply target 100 remains to be disabled.

When removal of the electronic apparatus 510 is detected as shown in A4 in FIG. 10, the electronic apparatus 510 is in a use state, and the discharging operation of the power receiving side is turned on, as shown in A5 in FIG. 9. Specifically, the discharging operation of the discharging portion 60 is switched from off to on, and the power from the battery 90 is supplied to the power supply target 100 via the discharging portion 60. Accordingly, power from the battery 90 is supplied, the power supply target 100 such as a processing unit operates using the power, and the electronic apparatus 510 is in a state in which a user can use it normally.

In the present embodiment, as described above, when landing of the electronic apparatus 510 is detected, normal power transmission is performed, and regular load modulation is performed in the normal power transmission period, as shown in A1 in FIG. 10. Also, when landing is detected, the discharging operation of the discharging portion 60 is stopped. In this regular load modulation, communication data including information for controlling power on the power transmitting side, and information representing the status on the power receiving side are transmitted from the power receiving side to the power transmitting side. For example, by transmitting the information (transmitting power setting information) for power control, optimum power control based on the positional relationship or the like between the primary coil L1 and the secondary coil L2 can be realized, for example. Also, by transmitting the information representing the status on the power receiving side, an optimum and safe charging environment can be realized. Also, in the present embodiment, normal power transmission continues while the load modulation continues, and the discharging operation of the discharging portion 60 remains off.

Also, in the present embodiment, when full charge of the battery 90 is detected, normal power transmission is stopped, and intermittent power transmission for removal detection is performed, as shown in A3 in FIG. 10. When removal is detected and the removed period begins, the discharging operation of the discharging portion 60 is performed, as shown in A4 and A5 in FIG. 10. Accordingly, power from the battery 90 is supplied to the power supply target 100, and normal operation of the electronic apparatus 510 becomes possible. Note that landing detection and removal detection are performed based on the output voltage VCC of the power receiving portion 52.

In the present embodiment, as described above, the discharging operation for discharge to the power supply target 100 is turned off in a charge period (normal power transmission period) of the battery 90 in the electronic apparatus 510, and therefore a situation in which power is wastefully consumed in the charge period by the power supply target 100 can be suppressed.

When removal of the electronic apparatus 510 is detected, the discharging operation for discharge to the power supply target 100 is turned on along with switching being performed from normal power transmission to intermittent power transmission. As a result of the discharging operation being turned on, power from the battery 90 is supplied to the power supply target 100, and normal operation of the power supply target 100 such as a processing unit (DSP) becomes possible. In this way, an operation sequence of preferable contactless power transmission can be realized in a type of electronic apparatus 510 (electronic apparatus such as a hearing aid or a wearable apparatus that is worn by a user, for example) that does not operate in the charge period during which the electronic apparatus 510 is placed on the charger 500, for example.

Figure 11:
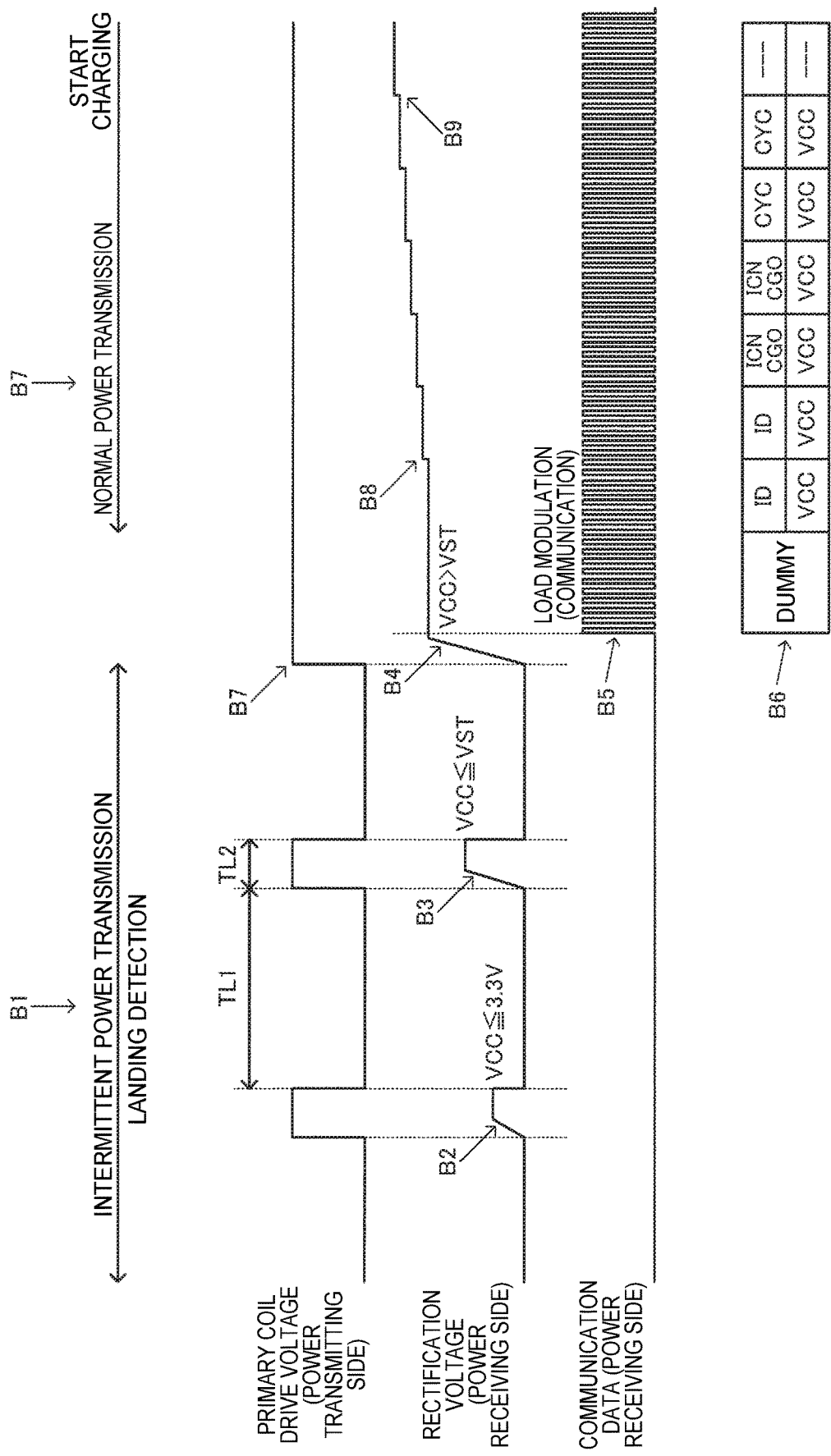
FIG. 11 is a signal waveform diagram for describing an operation sequence at the time of landing detection.
Figure 12:
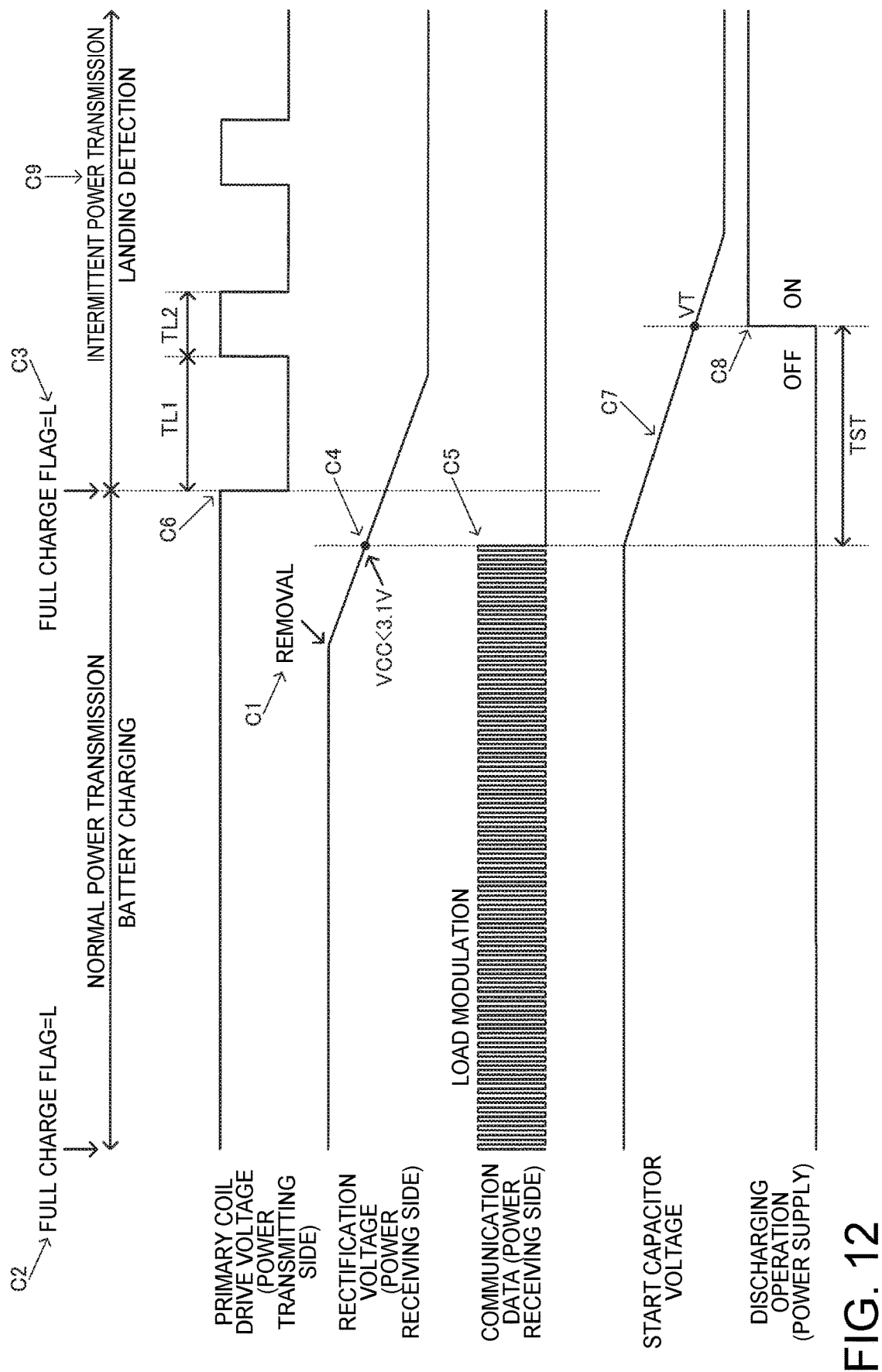
FIG. 12 is a signal waveform diagram for describing the operation sequence at the time of removal.
Figure 13:
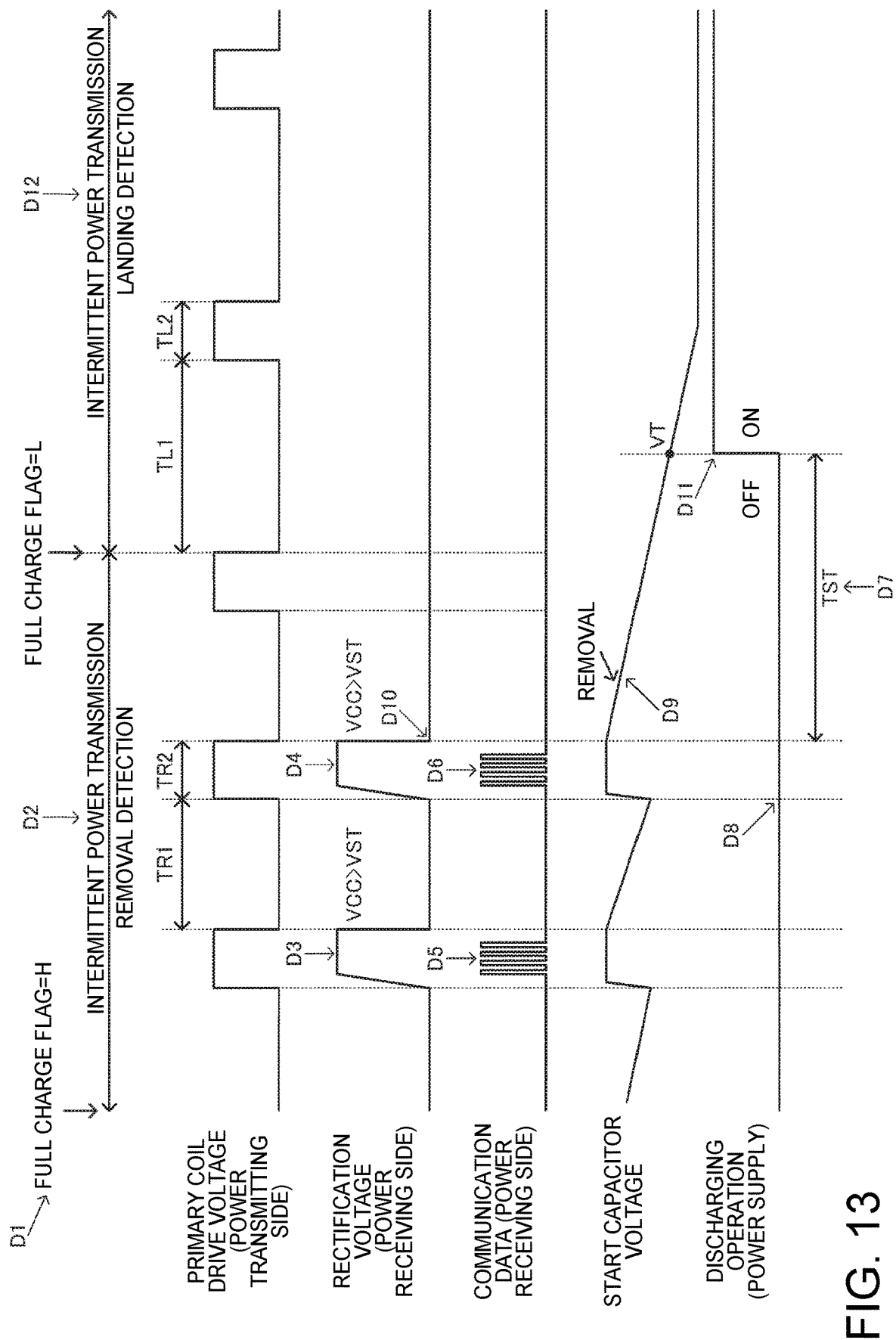
FIG. 13 is a signal waveform diagram for describing the operation sequence at the time of removal.

FIGS. 11 to 13 are signal waveform diagrams for describing a detailed operation sequence of the contactless power transmission system of the present embodiment.

B1 in FIG. 11 is the stand-by state in A1 in FIG. 10, and intermittent power transmission for landing detection is performed. That is, power transmission in a period TL2 is performed at the intervals of a period TL1. The period of TL1 is 3 s for example, and the period of TL2 is 50 ms for example. In B2 and B3 in FIG. 11, the rectified voltage VCC is less than or equal to the voltage VST (less than or equal to the first voltage), and therefore, communication by load modulation is not performed.

On the other hand, in B4, the rectified voltage VCC exceeds the voltage VST (4.5 V, for example), and therefore the load modulation portion 56 starts load modulation, as shown in B5. That is, although the coils L1 and L2 are not in a sufficiently electromagnetically coupled state in B2 and B3, the coils L1 and L2 are in a properly electromagnetically coupled state in B4, as shown in FIG. 1B. Accordingly, the rectified voltage VCC increases and exceeds the voltage VST, and load modulation is started, as shown in B5. Then, communication data as shown in B6 is transmitted to the power transmitting side by this load modulation. The start of the load modulation in B5 is triggered by the increase in the rectified voltage VCC due to the intermittent power transmission for landing detection shown in B7.

Specifically, the power receiving side transmits dummy data (64 bits of "0", for example) for landing detection. The power transmitting side detects landing of the power receiving side by detecting this dummy data (detecting 8 bits of "0", for example), and starts normal power transmission (continuous power transmission) as shown in B7.

Next, the power receiving side transmits information such as ID authentication information or rectified voltage VCC. Simplified authentication processing can be realized as a result of the power transmitting side making a reply with respect to the transmission of the ID authentication information.

Also, the power transmitting side controls the transmitting power by receiving the transmitting power setting information, which is information of the rectified voltage VCC. As a result of the power transmitting side controlling the transmitting power, the rectified voltage VCC increases as shown in B8. Then, when the VCC exceeds the voltage VCCL (second voltage), as shown in B9, charging of the battery 90 is started.

In the present embodiment in this way, the voltage VST at which the load modulation (communication) is started can be set low. Accordingly, the occurrence of a failure such as a breakdown voltage abnormality caused by the drive voltage of the power transmitting side being set high can be suppressed. The transmitting power of the power transmitting side is controlled by transmitting the transmitting power setting information (VCC) to the power transmitting side by the started load modulation, and as a result of controlling the transmitting power, the rectified voltage VCC increases, as shown in B8. Then, when the rectified voltage VCC increases and exceeds the voltage VCCL, which is a chargeable voltage, as shown in B9, charging of the battery 90 is started. Accordingly, both of the landing detection over a large distance range and suppression of the occurrence of failure such as a breakdown voltage abnormality can be realized.

In C1 in FIG. 12, the electronic apparatus 510 is removed in a normal power transmission period during which charging of the battery 90 is performed. The removal in C1 is removal before the battery 90 is fully charged (full charge flag=Low level), as shown in C2 and C3.

When the electronic apparatus 510 is removed in this way, the power on the power transmitting side is not transmitted to the power receiving side, and the rectified voltage VCC decreases. Then, when VCC has decreased below 3.1 V, for example, as shown in C4, load modulation by the load modulation portion 56 is stopped, as shown in C5. When load modulation is stopped, normal power transmission by the power transmission portion 12 is stopped, as shown in C6.

Also, when the rectified voltage VCC decreases below 3.1 V, for example, which is a judgement voltage, discharge of an unshown start capacitor on the power receiving side is started. The start capacitor is a capacitor for starting up the discharging operation (for measurement of a start-up period) on the power receiving side, and is provided as a component external to the power receiving side control device 50, for example. When a start-up period TST elapses after the rectified voltage VCC has decreased below the judgement voltage (3.1 V), the discharging operation of the discharging portion 60 is switched from off to on, as shown in C8, and power from the battery 90 starts to be supplied to the power supply target 100. Also, the power transmission portion 12 starts to perform intermittent power transmission for landing detection, as shown in C9, after normal power transmission has been stopped.

Note that, in the present embodiment, a charging system control portion and a discharging system control portion are provided as the control portion 54 on the power receiving side. The charging system control portion operates by receiving a power supply voltage generated from the rectified voltage VCC (output voltage) of the power receiving portion 52. Meanwhile, the discharging system control portion and the discharging portion 60 operate by receiving a power supply voltage generated from the battery voltage VBAT. Charging/discharging control of the start capacitor and control of the discharging portion 60 (on/off control) are performed by the discharging system control portion.

In D1 in FIG. 13, the full charge flag is at a high level which is an active level, and the full charge of the battery 90 is detected. When the full charge is detected in this way, the intermittent power transmission for removal detection after full charge is performed, as shown in D2. That is, power transmission is performed during a period TR2 at the intervals of a period TR1. The period TR1 is 1.5 s, for example, and the period TR2 is 50 ms, for example. The period TR1 of the intermittent power transmission for removal detection is shorter than the period TL1 of the intermittent power transmission for landing detection.

The rectified voltage VCC of the power receiving portion 52 increases above VST due to the intermittent power transmission for removal detection, as shown in D3 and D4 in FIG. 13, and the load modulation is performed as shown in D5 and D6. The fact that the electronic apparatus 510 has not been removed can be detected on the power transmitting side by detecting the load modulation (null communication data or the like).

Also, the interval of the intermittent power transmission period TR1 (1.5 s, for example) for removal detection is shorter than the start-up period TST (longer than 3 s, for example) shown in D7 that is set by the aforementioned start capacitor. Therefore, in a state in which the electronic apparatus 510 is not removed, the voltage of the start capacitor (charge voltage) does not decrease below the threshold voltage VT for turning on the discharging operation, and switching from off to on of the discharging operation is not performed, as shown in D8.

On the other hand, the electronic apparatus 510 is removed in D9. The rectified voltage VCC decreases below 3.1 V which is the judgement voltage, as shown in D10, after the intermittent power transmission period TR2 for removal detection shown in D4 ends, and therefore measurement of the start-up period TST shown in D7 is started. Then, in D11, the voltage of the start capacitor decreases below the threshold voltage VT for turning on the discharging operation, and the elapse of the start-up period TST is detected. Accordingly, the discharging operation of the discharging portion 60 is switched from off to on, and power from the battery 90 begins to be supplied to the power supply target 100. Also, as shown in D12, intermittent power transmission for landing detection of the electronic apparatus 510 starts to be performed.

In the present embodiment as described above, on the condition that the power receiving device 40 has started the load modulation, as shown in B5 in FIG. 11, normal power transmission by the power transmission portion 12 is started, as shown in B7. While the load modulation in B5 continues, the normal power transmission shown in B7 continues. Specifically, as shown in C5 in FIG. 12, in the case where load modulation is no longer detected, normal power transmission by the power transmission portion 12 is stopped as shown in C6. Then, intermittent power transmission for landing detection by the power transmission portion 12 starts to be performed, as shown in C9.

In the present embodiment as described above, an operation sequence is adopted in which normal power transmission is started on the condition that the load modulation has started, the normal power transmission continues while load modulation continues, and the normal power transmission is stopped when the load modulation is not detected any more. In this way, contactless power transmission and communication by load modulation can be realized in a simple operation sequence. Also, as a result of performing communication by regular load modulation during a normal power transmission period, effective contactless power transmission according to the state of the power transmission or the like can be realized.

6. Method of Communication from Power Receiving Device to Power Transmitting Device Next, a method of communicating by load modulation will be described using FIG. 14. For example, in the present embodiment, the power receiving device 40 transmits the aforementioned ID authentication information, transmitting power setting information, and the like, to the control device 20 of the power transmitting device 10 by performing load modulation, and the control device 20 of the power transmitting device 10 receives these types of information.

Figure 14:
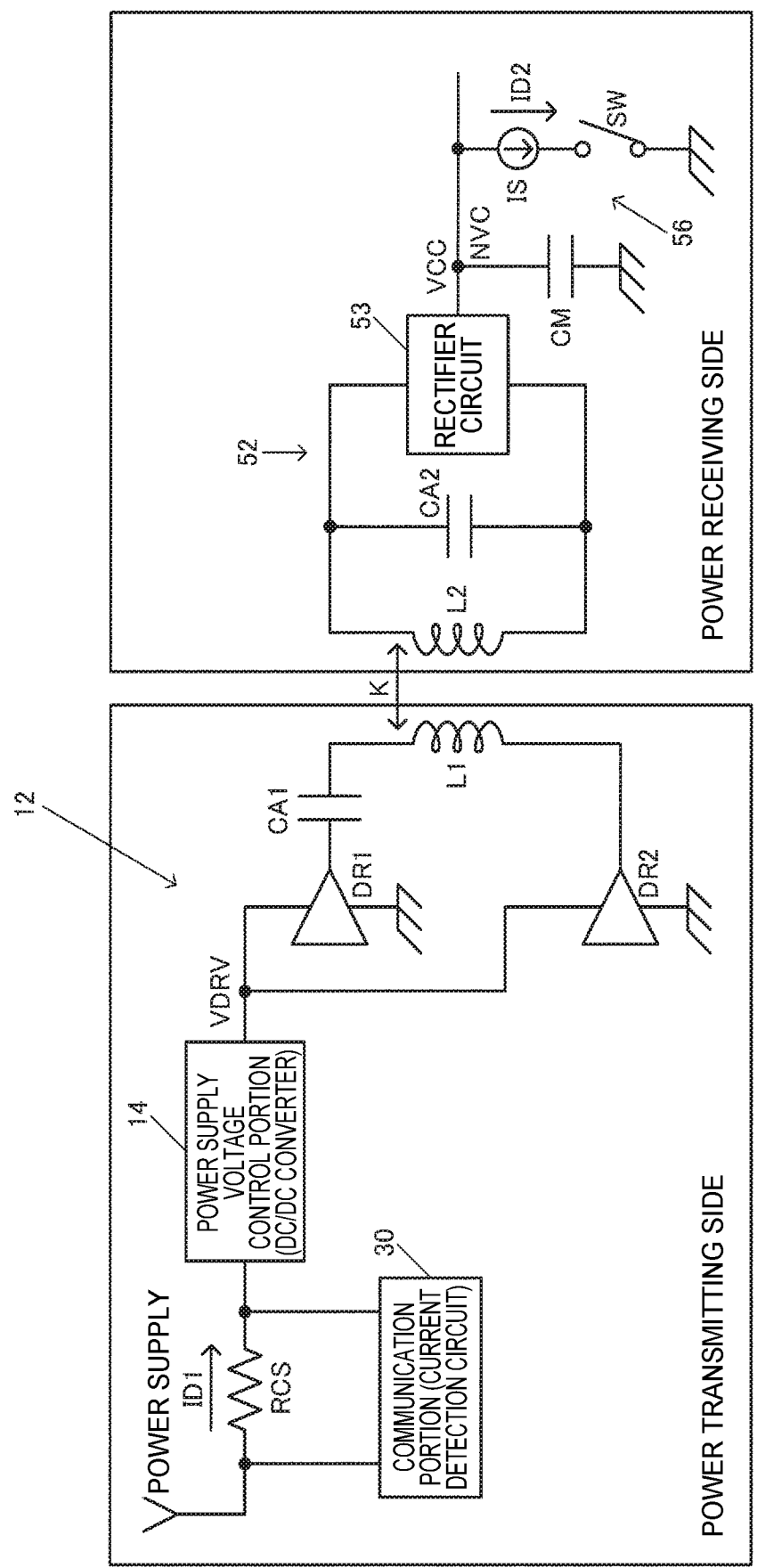
FIG. 14 is a diagram for describing a communication method using load modulation.

In this case, as shown in FIG. 14, the power transmission drivers DR1 and DR2 drive the primary coil L1 on the power transmitting side based on the power supply voltage VDRV supplied from the power supply voltage control portion 14, as shown in FIG. 13.

Meanwhile, on the power receiving side (secondary side), the coil end voltage of the secondary coil L2 is rectified by the rectifier circuit 53 in the power receiving portion 52, and a rectified voltage VCC is output to the node NVC. Note that the primary coil L1 and a capacitor CA1 constitute a resonance circuit on the power transmitting side, and the secondary coil L2 and a capacitor CA2 constitute a resonance circuit on the power receiving side.

On the power receiving side, a current ID2 of the current source IS is caused to intermittently flow from the node NVC to the GND side by turning on and off the switching element SW in the load modulation portion 56 shown in FIG. 3 described above, and thus the load state (potential on the power receiving side) on the power receiving side is changed. Also, in this case, the communication data generation portion 43 shown in FIG. 5 described above generates a control signal CSW for transmitting the communication data based on the measured power transmission frequency, and outputs the control signal CSW to the load modulation portion 56. The load modulation portion 56 is caused to perform load modulation corresponding to the communication data by on and off control of the switching element SW being performed, for example, using the control signal CSW.

On the power transmitting side, a current ID1 that flows in a sense resistor RCS provided in a power supply line changes due to the change of the load state on the power receiving side caused by load modulation. For example, the sense resistor RCS for detecting the current that flows in a power supply is provided between the power supply (power supply device such as the power supply adapter 502 shown in FIG. 1A, for example) on the power transmitting side and the power supply voltage control portion 14. A power supply voltage is supplied from the power supply to the power supply voltage control portion 14 via the sense resistor RCS. A current ID1 that flows from the power supply to the sense resistor RCS changes due to the change of the load state on the power receiving side caused by load modulation, and the communication portion 30 detects the change in the current. Then, the communication portion 30 performs a detection operation for detecting communication data that is transmitted by load modulation based on the detection result.

Also, the load modulation portion 56 performs load modulation by changing the load state (load by load modulation) on the power receiving side to states such as a first load state and a second load state, for example. The first load state is a state in which the switching element SW is turned on, for example, and is a state in which the load state (load in load modulation) on the power receiving side is a high load (low impedance). The second load state is a state in which the switching element SW is turned off, for example, and is a state in which the load state (load in load modulation) on the power receiving side is a low load (high impedance).

For example, communication data is transmitted from the power receiving side to the power transmitting side by associating the first load state with a logic level "1" (first logic level) of the communication data and associating the second load state with a logic level "0" (second logic level) of the communication data. That is, communication data having a predetermined number of bits is transmitted by turning on the switching element SW if the logic level of a bit in the communication data is "1", and by turning off the switching element SW if the logic level of the bit in the communication data is "0".

Also, the present embodiment is not limited to the communication system described above. For example, the communication data in which the logic level "1" (data 1) and the logic level "0" (data 0) of bits are indicated by load modulation patterns, as shown in FIG. 15, may be transmitted from the power receiving side, and the communication data may be detected on the power transmitting side. In this case, the load modulation portion 56 on the power receiving side performs load modulation such that the load modulation pattern is a first pattern PT1 for a first logic level "1" of the communication data that is to be transmitted to the power transmitting device 10. On the other hand, the load modulation portion 56 on the power receiving side performs load modulation such that the load modulation pattern is a second pattern PT2 that is different from the first pattern PT1 for a second logic level "0" of the communication data.

The communication portion 30 (demodulation portion) on the power transmitting side determines that the communication data is communication data of the first logic level "1" if the load modulation pattern is the first pattern PT1. On the other hand, the communication portion 30 determines that the communication data is communication data of the second logic level "0" if the load modulation pattern is the second pattern PT2 that is different from the first pattern PT1.

Here, the load modulation pattern is a pattern constituted by the first load state and the second load state. The first load state is a state in which the load on the power receiving side set by the load modulation portion 56 is a high load, for example. Specifically, in FIG. 15, a period TM1 in the first load state is a period in which the switching element SW in the load modulation portion 56 is turned on and the current of the current source IS flows from the node NVC to the GND side, and is a period corresponding to a high level (bit=1) in the first and second patterns PT1 and PT2.

On the other hand, the second load state is a state where the load on the power receiving side set by the load modulation portion 56 is a low load, for example. Specifically, in FIG. 15, a period TM2 in the second load state is a period in which the switching element SW in the load modulation portion 56 is turned off, and is a period corresponding to a low level (bit=0) in the first and second patterns PT1 and PT2.

In FIG. 15, the first pattern PT1 is a pattern in which the width of period TM1 in the first load state is longer than that in the second pattern PT2. The first pattern PT1 in which the width of period TM1 in the first load state is longer than that in the second pattern PT2 is determined to be the logic level "1". On the other hand, the second pattern PT2 in which the width of period TM1 in the first load state is shorter than that in the first pattern PT1 is determined to be the logic level "0".

As shown in FIG. 15, the first pattern PT1 is a pattern corresponding to a bit pattern (1110), for example. The second pattern PT2 is a pattern corresponding to a bit pattern (1010), for example. In these bit patterns, bit=1 corresponds to a state in which the switching element SW in the load modulation portion 56 is turned on, and bit=0 corresponds to a state in which the switching element SW in the load modulation portion 56 is turned off.

Accordingly, even in a noisy situation, proper detection of the communication data is enabled.

Next, an example of the communication data format used in the present embodiment is shown in FIGS. 16A and 16B.

In FIG. 16A, the communication data is constituted by 64 bits, and one packet is configured by these 64 bits. The data of the first set of 16 bits is 0000h. In the case where normal power transmission (or intermittent power transmission) is started on the power transmitting side by detecting the load modulation on the power receiving side, for example, a certain amount of time is required before the current detection circuit or the like in the communication portion 30 operates and the communication data can be properly detected. Therefore, 0000h that is dummy (null) data is set to the first 16 bits. Various processing necessary for bit synchronization, for example, is performed on the power transmitting side in a communication period of the first 16 bits 0000h.

A data code and information on the rectified voltage (VCC) are set in the second set of 16 bits. The data code is a code for specifying data that is to be transmitted by the third set of 16 bits, as shown in FIG. 16B. The rectified voltage (VCC) is used as transmitting power setting information of the power transmitting device 10.

Information such as temperature, a battery voltage, a battery current, a status flag, number of cycles, an IC number/charging execution/off start, or ID is set to the third set of 16 bits according to the setting designated by the data code. The temperature is a battery temperature or the like, for example. The battery voltage and the battery current are information representing the charge state of the battery 90. The status flag is information representing a status on the power receiving side such as a temperature error (high temperature abnormality, low temperature abnormality), a battery error (battery voltage less than or equal to 1.0 V), an over-voltage error, a timer error, or full charge (normal end), for example. The number of cycles (cycle time) is information representing the number of charging times. The IC number is a number for specifying a control device IC. The charging execution flag (CGO) is a flag that indicates that the power transmitting side that has been authenticated is appropriate and charging is executed based on transmitting power from the power transmitting side. CRC information is set in the fourth set of 16 bits.

Note that the communication method of the present embodiment is not limited to the method described in FIGS. 15 to 16B and the like, and various modifications can be implemented. For example, although the first pattern PT1 is associated with the logic level "1" and the second pattern PT2 is associated with the logic level "0" in FIG. 15, the association relationship may be reversed. Also, the first and second patterns PT1 and PT2 in FIG. 15 are examples of the load modulation patterns, and the load modulation patterns of the present embodiment are not limited thereto and various modifications can be implemented. For example, although the first and second patterns PT1 and PT2 are set to have the same length in FIG. 15, they may be set to have different lengths. Also, in FIG. 15, although the first pattern PT1 of bit pattern (1110) and the second pattern PT2 of bit pattern (1010) are used, the first and second patterns PT1 and PT2 having different bit patterns may be adopted. For example, it is sufficient that the first and second patterns PT1 and PT2 are patterns in which at least the first load state period TM1 (or second load state period TM2) is different, and various patterns that are different from those shown in FIG. 15 can be adopted. Also, the communication data format and the communication processing are not limited to the methods described in the present embodiment and various modifications can be implemented.

7. Power Receiving Portion and Charging Portion

Figure 17:
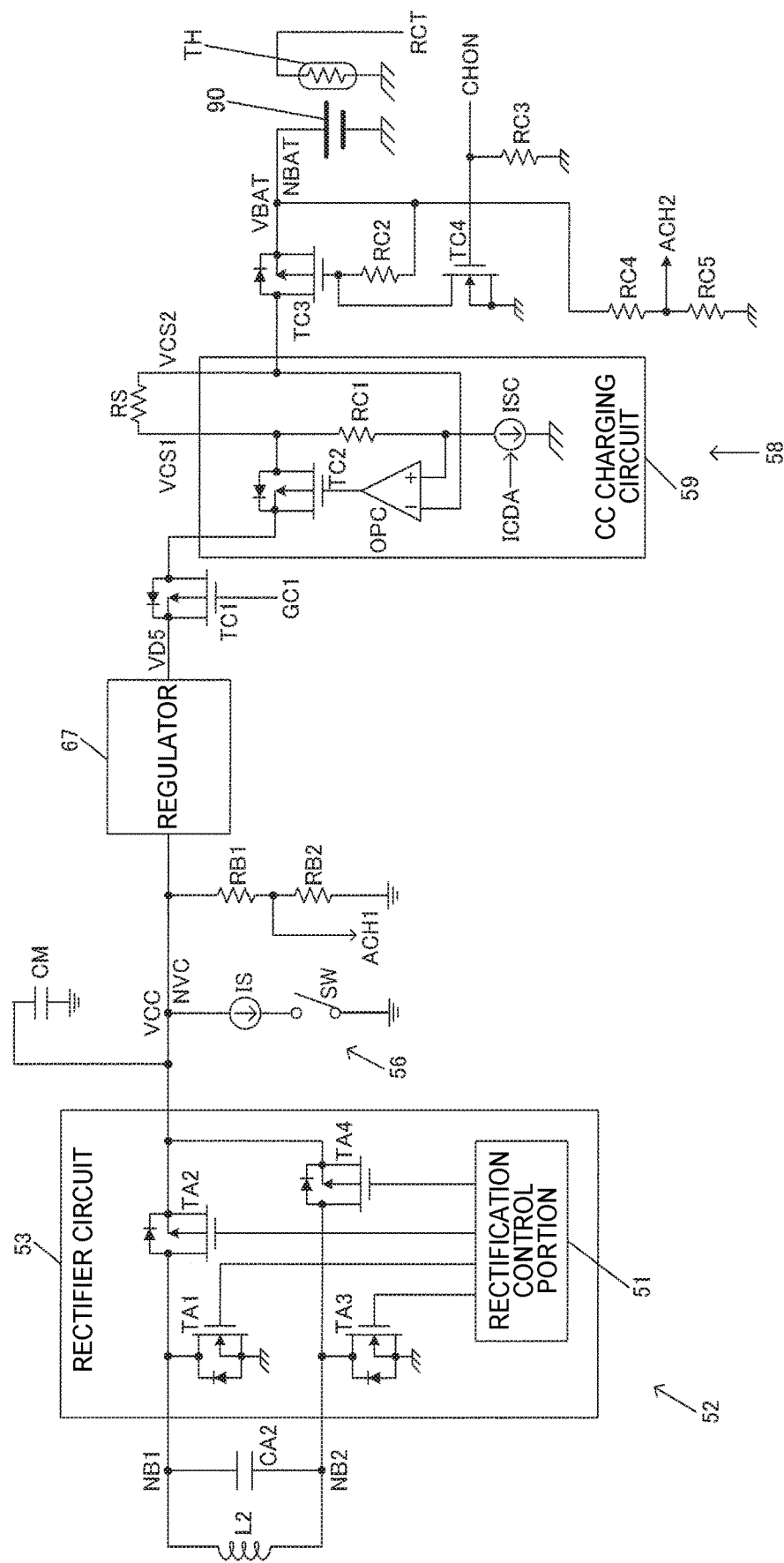
FIG. 17 is a detailed exemplary configuration of a power receiving portion and a charging portion.

A detailed exemplary configuration of the power receiving portion 52, the charging portion 58, and the like is shown in FIG. 17. The rectifier circuit 53 in the power receiving portion 52 includes transistors TA1, TA2, TA3, and TA4 for rectification and a rectification control portion 51 for controlling these transistors TA1 to TA4, as shown in FIG. 17. A body diode is provided between a drain and a source of each of the transistors TA1 to TA4. The rectification control portion 51 performs rectification control for generating the rectified voltage VCC by outputting control signals to gates of the transistors TA1 to TA4.

Resistors RB1 and RB2 are provided in series between the node NVC of the rectified voltage VCC and the GND node. A voltage ACH1 that is generated by voltage-dividing the rectified voltage VCC with the resistors RB1 and RB2 is input to the A/D converter circuit 65, for example. Accordingly, monitoring of the rectified voltage VCC is made possible, and thus power control based on the VCC and control of communication start and charging start based on the VCC can be realized.

The regulator 67 performs voltage adjustment (regulation) on the rectified voltage VCC, and outputs a voltage VD5. The voltage VD5 is supplied to the CC charging circuit 59 in the charging portion 58 via a transistor TC1. The transistor TC1 is turned off with a control signal GC1 when an over-voltage of the battery voltage VBAT exceeding a given voltage is detected, for example. Note that circuits (circuits except for circuits in a discharging system such as the discharging portion 60) in the control device 50 operate with a voltage based on the voltage VD5 (voltage resulting from regulating VD5 or the like) as a power supply voltage.

The CC charging circuit 59 includes a transistor TC2, an operational amplifier OPC, a resistor RC1, and a current source ISC. Through virtual short of the operational amplifier OPC, the transistor TC2 is controlled such that the voltage (non-inverting input terminal voltage) on one end of the resistor RC1 is equal to the voltage VCS2 (inverting input terminal voltage) on another end of the sense resistor RS, which is an external component. The current that flows in the current source ISC by the control of the signal ICDA is represented as IDA, and the current that flows in the sense resistor RS is represented as IRS. Control is performed such that the equation IRS×RS=IDA×RC1 holds. That is, in the CC charging circuit 59, the current IRS (charge current) that flows in the sense resistor RS is controlled so as to be a constant current value that is set by the signal ICDA. In this way, CC (Constant-Current) charging is made possible.

A transistor TC3 is provided between an output node of the CC charging circuit 59 and a supply node NBAT of the battery voltage VBAT. A drain of an N-type transistor TC4 is connected to a gate of the P-type transistor TC3, and a charging control signal CHON from the control portion 54 is input to a gate of the transistor TC4. Also, a pull-up resistor RC2 is provided between the gate of the transistor TC3 and the node NBAT, and a pull-down resistor RC3 is provided between the gate of the transistor TC4 and a GND (power supply on a low potential side) node. The power supply switch 42 in FIG. 2 is realized by the transistor TC3 (TC4).

When charging is performed, the control portion 54 sets the control signal CHON to an active level (high level). Accordingly, the N-type transistor TC4 is turned on, and the gate voltage of the P-type transistor TC3 becomes a low level. As a result, the transistor TC3 is turned on, and the charging of the battery 90 is performed.

On the other hand, when the control portion 54 sets the control signal CHON to an inactive level (low level), the N-type transistor TC4 is turned off. The gate voltage of the P-type transistor TC3 is pulled up to the battery voltage VBAT by the resistor RC2, and as a result, the transistor TC3 is turned off and the charging of the battery 90 is stopped.

Also, when the power supply voltage of the charging system becomes lower than the operation lower limit voltage of the circuit, the gate voltage of the transistor TC4 is pulled down to GND by the resistor RC3, and thus the transistor TC4 is turned off. Also, the gate voltage of the transistor TC3 is pulled up to the battery voltage VBAT by the resistor RC2, and thus the transistor TC3 is turned off. In this way, when the power receiving side is removed, and the power supply voltage becomes lower than the operation lower limit voltage, as a result of the transistor TC3 being turned off, the path between the output node of the CC charging circuit 59 and the node NBAT of the battery 90 is electrically cut off. Accordingly, reverse flow from the battery 90 when the power supply voltage becomes less than or equal to the operation lower limit voltage can be prevented.

Resistors RC4 and RC5 are provided in series between the node NBAT and the GND node, and a voltage ACH2 that is generated by voltage-dividing the battery voltage VBAT with the resistors RC4 and RC5 is input to the A/D converter circuit 65. Accordingly, monitoring of the battery voltage VBAT is made possible, and various types of control can be realized based on the charge state of the battery 90. Also, a thermistor TH (temperature detection portion, in a broad sense) is provided in the vicinity of the battery 90. A voltage RCT on one end of the thermistor TH is input to the control device 50, and thereby measurement of the battery temperature is made possible.

Although this embodiment has been described above in detail, those skilled in the art will easily understand that various modifications are possible without substantially departing from the new matter and the effect of the invention. Accordingly, all those modifications are to be encompassed in the scope of the invention. For example, a term that is used at least once together with another term having a broader or the same meaning in the specification or the drawings may be replaced with the other term in any part of the specification or the drawings. Configurations, operations, or the like of the control device, the power receiving device, the electronic apparatus, and the power transmission system are not limited to those described in this embodiment either, and various modifications can be implemented.

This application claims priority from Japanese Patent Application No. 2016-035449 filed in the Japanese Patent Office on Feb. 26, 2016, the entire disclosure of which is hereby incorporated by reference in its entirely.

What is claimed is:

1. A control device used in a power receiving device that contactlessly receives power from a power transmitting device, the control device comprising:
   a control portion configured to:
      control a power supply portion that supplies power to a load based on received power received by a power receiving portion in the power receiving device from the power transmitting device; and
      in a case where the power receiving portion, after receiving a first signal having a first frequency and a first duty from the power transmitting device, has received a second signal from the power transmitting device, the second signal having a second frequency that is different from the first frequency or having a second duty that is different from the first duty:
         in a case of having judged that a time length of a reception period during which the power receiving portion has received the second signal is a first length, specify that an issued communication data issued by the power transmitting device is first communication data; and
         in a case of having judged that the time length of the reception period is a second length that is different from the first length, specify that the issued communication data is second communication data that is different from the first communication data.

2. The control device according to claim 1, wherein the second frequency is a frequency that is higher than the first frequency.

3. The control device according to claim 1, wherein the control portion measures a frequency in a given period before the reception period as a reference frequency, and measures the time length of the reception period based on the reference frequency.

4. The control device according to claim 1, further comprising an oscillator circuit that generates an oscillation signal,
   wherein the control portion is configured to measure the time length of the reception period based on the oscillation signal generated by the oscillator circuit.

5. A power receiving device comprising the control device according to claim 1.

6. An electronic apparatus comprising the control device according to claim 1.

7. A control device included in a power transmitting device that contactlessly transmits power to a power receiving device, the control device comprising:
   a control portion configured to:
      control a power transmission portion in the power transmitting device that transmits power to the power receiving device;
      cause the power transmission portion to transmit a first signal having a first frequency and a first duty to the power receiving device during a time period having a first length, to issue a first communication data to the power receiving device; and
      after causing the power transmission portion to transmit the first signal, cause the power transmission portion to transmit a second signal having a second frequency that is different from the first frequency or a second duty that is different from the first duty, during a time period having a second length that is different from the first length, to issue second communication data to the power receiving device.

8. The control device according to claim 7, wherein the control portion is configured to change the frequency or the duty at a given timing after the power receiving device has started load modulation.

9. A control device included in a power transmitting device that contactlessly transmits power to a power receiving device, the control device comprising:
   a control portion configured to:
      control a power transmission portion in the power transmitting device that transmits power to the power receiving device;
      cause the power transmission portion to be driven at a first frequency and a first duty during a time period having a first length, to issue a first communication data to the power receiving device; and
      after causing the power transmission portion to be driven at the first frequency and the first duty, cause the power transmission portion to be driven at a second frequency that is different from the first frequency or at a second duty that is different from the first duty, during a time period having a second length that is different from the first length, to issue second communication data to the power receiving device.

10. A contactless power transmission system comprising a power transmitting device and a power receiving device,
   wherein the power transmitting device is configured to:
      contactlessly transmit a first signal having a first frequency and a first duty to the power receiving device, and
      in a case where the power receiving device is in communication with the power transmitting device, contactlessly transmit a second signal having a second frequency that is different from the first frequency or having a second duty that is different from the first duty during a period having a prescribed length, and the power receiving device, after contactlessly receiving the first signal from the power transmitting device, is configured to:

contactlessly receive the second signal from the power transmitting device, in a case of having judged that a time length of a reception period during which the power receiving device has received the second signal is a first length, specify that an issued communication data issued by the power transmitting device is first communication data, and in a case of having judged that the time length of the reception period is a second length that is different from the first length, specify that the issued communication data is second communication data that is different from the first communication data.

11. A control device used in a power receiving device that contactlessly receives power from a power transmitting device, the control device comprising:

a processor configured to control a power supply that supplies power to a load based on received power, the received power being received by a power receiver in the power receiving device from the power transmitting device, the processor being programmed to:

determine whether the power receiver has received a first signal having a first frequency and a first duty from the power transmitting device;

determine whether the power receiver has received a second signal from the power transmitting device, the second signal having a second frequency that is different from the first frequency or having a second duty that is different from the first duty;

determine a time length of a reception period during which the power receiver has received the second signal;

in a case of having determined that the time length of the reception period is a first length, specify that an issued communication data issued by the power transmitting device is first communication data; and in a case of having determined that the time length of the reception period is a second length that is different from the first length, specify that the issued communication data is second communication data that is different from the first communication data.

* * * * *